(12) United States Patent
Kimita et al.

(10) Patent No.: US 8,556,622 B2
(45) Date of Patent: Oct. 15, 2013

(54) INJECTION MOLD FORMING AN ARTICLE HAVING A PIN MOUNTING HOLE

(75) Inventors: Yohei Kimita, Tokyo (JP); Masafumi Okada, Tokyo (JP); Hiroshi Akimoto, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 90 days.

(21) Appl. No.: 13/280,958

(22) Filed: Oct. 25, 2011

(65) Prior Publication Data

US 2012/0177776 A1    Jul. 12, 2012

(30) Foreign Application Priority Data

Jan. 7, 2011   (JP) .................................. 2011-001629

(51) Int. Cl.
*B29C 45/40* (2006.01)

(52) U.S. Cl.
USPC .......................................... 425/556; 264/334

(58) Field of Classification Search
USPC ........................... 425/556; 264/334, 335, 336
See application file for complete search history.

(56) References Cited

U.S. PATENT DOCUMENTS

| | | | | |
|---|---|---|---|---|
| 4,099,905 A * | 7/1978 | Nash et al. | ..................... | 425/589 |
| 4,741,874 A * | 5/1988 | Harrison | ....................... | 264/161 |
| 5,167,898 A * | 12/1992 | Luther | ......................... | 264/328.1 |
| 5,443,556 A * | 8/1995 | Hasegawa et al. | ............ | 101/116 |
| 5,980,809 A * | 11/1999 | Crain et al. | .................... | 264/318 |
| 6,364,654 B1 * | 4/2002 | Luther | .......................... | 425/556 |

FOREIGN PATENT DOCUMENTS

JP      2003-127183 A     5/2003

\* cited by examiner

*Primary Examiner* — Tim Heitbrink
(74) *Attorney, Agent, or Firm* — Maier & Maier, PLLC

(57) ABSTRACT

The pin mounting hole used to insert and mount the pin member having a pin-like shape is formed on, among the inner wall surfaces of the cavity, the second side-wall surface that is an inner wall surface other than the inner wall surfaces perpendicular to the mold-removal direction of the injection-molded article. On the second side-wall surface, the protruding portion protruding from the second side-wall surface is formed in the surface area located on the opposite side in the mold-removal direction with respect to the pin mounting hole.

14 Claims, 28 Drawing Sheets

INJECTION MOLD FORMING AN ARTICLE HAVING A PIN MOUNTING HOLE

RELATED APPLICATIONS

This application claims priority under 35 U.S.C. §119 to Japanese Patent Application No.: 2011-001629, filed on Jan. 7, 2011, the disclosure of which is incorporated by reference herein in its entirety.

BACKGROUND OF THE INVENTION

1. Field of the Invention

The present invention relates to a mold for injection molding, and an injection molding method, an injection-molded article, and an injection molding machine using the mold for injection molding.

2. Description of Related Art

As one of common techniques to remove an injection-molded article having an undercut portion from the mold, Japanese Patent Application Publication No. 2003-127183 (hereinafter referred to as "Patent literature 1") discloses a slide-core technique. That is, as shown in FIG. 28 of the present application, Patent literature 1 discloses a mold for injection molding 103 including a stationary mold 100, a movable mold 101, and a slide core 102. The movable mold 101 can move in the vertical direction, and when the movable mold 101 is positioned at the highest position, the movable mold 101 engages with the stationary mold 100. The slide core 102 can move in the horizontal direction on the movable mold 101. This slide core 102 is equipped with a pin portion 106 that is used to form a hole 105 at one end of an injection-molded article 104. With this structure, by injecting a melted resin into the mold for injection molding 103 in a closed state, an injection-molded article 104 is formed. After the injection-molded article 104 is formed, by moving the movable mold 101 downward in the vertical direction, the mold for injection mold 103 is opened and the slide core 102 is moved backward in the horizontal direction by a guide rod (not shown) at the same time. In this way, the pin portion 106 is pulled away from the hole 105 of the injection-molded article 104, and the injection-molded article 104 can be thereby removed from the movable mold 101.

However, due to the recent trend of miniaturization of injection-molded articles, a possibility that physical interference occurs when an injection-molded article is removed from the mold for injection molding is increasing even for injection-molded articles in which no intentional undercut portion is provided unlike the above-described Patent literature 1. To explain this problem, a common structure of an injection molding machine and a mold for injection molding is shown hereinafter with reference to FIGS. 1 to 4.

[Injection Molding Machine 1]

As shown in FIG. 1, an injection molding machine 1 includes a machine pedestal 2. An injection unit 3 (melted-resin supply means), a mold clamping unit 4 (mold clamping means), and a mold for injection molding 5 are arranged on this machine pedestal 2.

The injection unit 3 includes a hopper 6 and a heating cylinder 7. The hopper 6 stores a resin that is used as raw material. The heating cylinder 7 heats the resin supplied from the hopper 6 and thereby transforms it into a melted resin. The melted resin formed inside the heating cylinder 7 is injected into a cavity 8 of the mold for injection molding 5 (also refer to FIG. 2).

The mold clamping unit 4 includes a stationary platen 9, a movable platen 10, a mold clamping drive unit 11, and an eject pin drive unit 12. A stationary-side mounting plate 13 of the mold for injection molding 5 is attached to the stationary platen 9 (also refer to FIG. 2). A movable-side mounting plate 14 of the mold for injection molding 5 is attached to the movable platen 10. The mold clamping drive unit 11 moves the movable platen 10 forward and backward with respect to the stationary platen 9, and thereby clamps and opens the mold for injection molding 5. The eject pin drive unit 12 moves an ejector plate 15 of the mold for injection molding 5 forward and backward.

[Mold for Injection Molding 5]

As shown in FIGS. 1 and 2, in the mold for injection molding 5, a stationary-side mounting plate 13, a stationary-side mold plate 16, a movable-side mold plate 17, a receiving plate 18, a spacer block 19, a movable-side mounting plate 14 are stacked on top of one another from the injection unit 3 side.

The stationary-side mounting plate 13 is attached to the stationary platen 9 of the mold clamping unit 4. A cavity 8 having a desired shape is formed between the stationary-side mold plate 16 and the movable-side mold plate 17. As shown in FIG. 2, in general, the stationary-side mold plate 16 and the movable-side mold plate 17 have a nesting structure. An injector plate 15 is housed inside the spacer block 19. The injector plate 15 is composed of an upper injector plate 20 and a lower injector plate 21. The injector plate 15 supports a plurality of injector pins 22. The movable-side mounting plate 14 is attached to the movable platen 10 of the mold clamping unit 4. Further, as shown in FIG. 2, a sprue 23, a runner 24, and a gate 25 are formed in the stationary-side mounting plate 13, the stationary-side mold plate 16, and the movable-side mold plate 17.

[Manufacturing Procedure of Injection-Molded Article 26]

In order to injection-mold an injection-molded article 26 like the one shown in FIG. 3 with the above-described structure, firstly, the mold for injection molding 5 is clamped by the mold clamping unit 4. As a result, as shown in FIG. 2, the sprue 23, the runner 24, the gate 25, and the cavity 8 are formed in the mold for injection molding 5. Next, a melted resin is injected into the mold for injection molding 5 by the injection unit 3. The melted resin injected from the injection unit 3 flows through the sprue 23, the runner 24, and the gate 25, and is charged into the cavity 8. Then, by cooling the mold for injection molding 5 by using cooling means (not shown), the melted resin charged in the cavity 8 is solidified.

After a predetermined time has elapsed from the start of the cooling, the mold for injection molding 5 is opened by the mold clamping unit 4. As a result, the injection-molded article 26, which is solidified and thereby formed in the cavity 8, is pulled away from the stationary-side mold plate 16 and is put into a state where the injection-molded article 26 is adhered to the inner wall surface of a recessed portion 27 of the movable-side mold plate 17 shown in FIG. 4. By moving the injector plate 15 forward by using the eject pin drive unit 12 in this state, the plurality of ejector pins 22 push out the injection-molded article 26 and the injection-molded article 26 is thereby removed from the movable-side mold plate 17.

[Place Where Problem Exists]

Next, an example of an FPC (Flexible Printed Circuit) connector 200 for use in a mobile phone is explained with reference to FIGS. 5, 6, and 7(a) to 7(e). Firstly, an example of the FPC connector 200 for use in a mobile phone is explained because the problem to be solved in the present application becomes particularly significant in extremely-small injection-molded articles such as a housing 201 of the FPC connector 200 for use in a mobile phone.

Now, as shown in FIG. 5, a large number of slits 202 are formed at regular intervals in the housing 201 of the FPC connector 200. Further, as shown in FIG. 6, a contact 203 is press-fitted in each of the slits 202. FIGS. 7(a) to 7(e) show a plane view, a front view, a bottom view, a left-side view, and a right-side view, respectively, of the housing 201 of the FPC connector 200. Supposing that the part of the housing 201 that is opposed to the gate 25 of the mold for injection molding 5, which is used to injection-mold the housing 201 of the FPC connector 200, is a part indicated by the symbol "G" in FIG. 7(d) (also refer to FIG. 4), the upper end face P1 in FIG. 7(a), the lower end face P2 in FIG. 7(c), and the side end face P3 in FIG. 7(e) correspond to the charging ends of the housing 201 at which a weld line is likely to appear.

Incidentally, there are cases in which a gas vent is formed on the inner wall surface at the charging end of the cavity 8 so that the air present in the cavity 8 before the charging and/or a gas generated from the melted resin are discharged to the outside and the melted resin is thereby smoothly charged into the cavity 8. A pin member (commonly called "gas discharge pin") is usually inserted in this gas vent so that only the air and the gas are selectively discharged to the outside while preventing the melted resin from leaking from the cavity 8 to the outside. The end face of the pin member on the cavity 8 side is ground so that the end face becomes flush with the inner wall surface at the charging end of the cavity 8 as much as possible.

In principle, it can be arbitrarily determined which of the upper end face P1 in FIG. 7(a), the lower end face P2 in FIG. 7(c), and the side end face P3 in FIG. 7(e), the pin member for facilitating the charging is opposed to.

However, as shown in FIG. 7(a), a large number of slits 202 need to be formed on the upper surface 201UP of the housing 201 of the FPC connector 200, and in order to form these slits 202, a large number of core pins need to be provided on the stationary-side mold plate 16 that faces the upper surface 201UP of the housing 201 of the FPC connector 200 (also refer to FIG. 2). Therefore, there is no sufficient space on the inner wall surface of the stationary-side mold plate 16 facing the upper end face P1 shown in FIG. 7(a) to dispose the pin member for the above-described purpose.

Similarly, as shown in FIG. 7(c), a large number of core pins need to be provided on the movable-side mold plate 17 that faces the lower surface 201LW of the housing 201 of the FPC connector 200 (also refer to FIG. 2). Therefore, there is no sufficient space on the inner wall surface of the movable-side mold plate 17 facing the lower end face P2 shown in FIG. 7(c) to dispose the pin member for the above-described purpose.

Based on these reasons and based on the elimination method, only the inner wall surface of the movable-side mold plate 17 that faces the side end face P3 shown in FIG. 7(e) have a sufficient space to dispose the pin member for discharging the gas and/or detecting the charging.

Next, a problem to be solved in this application is explained in a more detailed manner with reference to FIGS. 8 to 11.

FIGS. 8 and 9 show an aspect in which a pin mounting hole 29 (corresponding to the above-described gas vent) is formed on a side-wall surface 28, which is the inner wall surface facing the side end face P3 shown in FIG. 7(e) among the inner wall surfaces of the cavity 8, and a pin member 30 is inserted and mounted in this pin mounting hole 29.

Then, as described previously, the end face 31 of the pin member 30 on the cavity 8 side (also refer to FIG. 2) is ground so that the end face becomes flush with the inner wall surface 28 of the cavity 8 as much as possible. However, theoretically speaking, it is naturally impossible to make the end face 31 of the pin member 30 on the cavity 8 side perfectly flush with the side-wall surface 28 of the cavity 8. For example, as shown in FIG. 8, the end 32 of the pin member 30 may protrude into the cavity 8. Alternatively, as shown in FIG. 9, a recessed portion 33 may be formed on the side-wall surface 28 of the cavity 8. Note that in FIGS. 8 and 9, the amount of the deviation of the end face 31 of the pin member 30 from the side-wall surface 28 of the cavity 8 is illustrated in a considerably-exaggerated fashion for the sake of explanation.

In practice, this deviation amount is about 50 micrometers at maximum. However, even such a small deviation amount could result in the following problems.

That is, FIG. 10 shows an injection-molded article 26 that is injection-molded by using the movable-side mold plate 17 shown in FIG. 8. As shown in FIG. 10, a recessed portion 35, with which the end 32 of the pin member 30 shown in FIG. 8 engages, is formed on an outer wall surface 34 of the injection-molded article 26. Therefore, when the injection-molded article 26 is removed from the movable-side mold plate 17, the injection-molded article 26 physically interferes with the end 32 of the pin member 30, and thereby making the removal of the injection-molded article 26 very difficult. Further, if the injection-molded article 26 is removed from the movable-side mold plate 17 against this physical interference by force, the end 32 of the pin member 30 is rubbed against the surface area 36 located on the opposite side in the mold-removal direction with respect to the recessed portion 35, and thereby causing a burr-like damage in the surface area 36. Further, this burr-like damage could generate shavings, and thereby possibly causing faulty connection when an FPC cable is connected with the FPC connector 200.

Further, FIG. 11 shows an injection-molded article 26 that is injection-molded by using the movable-side mold plate 17 shown in FIG. 9. As shown in FIG. 11, a protrusion 37, which engages with the recessed portion 33 of the side-wall surface 28 shown in FIG. 9, is formed on an outer wall surface 34 of the injection-molded article 26. Therefore, when the injection-molded article 26 is removed from the movable-side mold plate 17, the protrusion 37 of the injection-molded article 26 physically interferes with the movable-side mold plate 17, and thereby making the removal of the injection-molded article 26 very difficult. Further, if the injection-molded article 26 is removed from the movable-side mold plate 17 against this physical interference by force, the protrusion 37 of the injection-molded article 26 is forcibly pushed downward in the direction opposite to the mold-removal direction and thereby significantly deformed. Further, this significant deformation could cause shavings, and thereby possibly causing faulty connection when an FPC cable is connected with the FPC connector 200.

Accordingly, an object of the present invention is, in a mold for injection molding including a stationary-side mold plate and a movable-side mold plate, in which a cavity is formed between the stationary-side mold plate and the movable-side mold plate, and an injection-molded article is injection-molded by charging this cavity with a melted resin, to provide a technique to remove the injection-molded article from the mold for injection molding without problems even when there is a pin member that is otherwise likely to prevent the injection-molded article from being smoothly removed.

SUMMARY OF THE INVENTION

In accordance with a first aspect of the present invention, a mold for injection molding including a stationary-side mold plate and a movable-side mold plate, in which a cavity is formed between the stationary-side mold plate and the movable-side mold plate, and an injection-molded article is injection-molded by charging this cavity with a melted resin has the following features. A pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity. On the side-wall surface in which the pin mounting hole is formed, a protruding portion protruding from the side-wall surface is formed in a surface area located on an opposite side in the mold-removal direction with respect to the pin mounting hole.

In accordance with a second aspect of the present invention, a mold for injection molding including a stationary-side mold plate and a movable-side mold plate, in which a cavity is formed between the stationary-side mold plate and the movable-side mold plate, and an injection-molded article is injection-molded by charging this cavity with a melted resin has the following features. A pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity. On the side-wall surface in which the pin mounting hole is formed, a recessed portion recessed from the side-wall surface is formed in a surface area located on a mold-removal direction side with respect to the pin mounting hole.

Preferably, the side-wall surface in which the pin mounting hole is formed is roughly parallel to the mold-removal direction.

Preferably, the side-wall surface in which the pin mounting hole is formed is an inner wall surface corresponding to a charging end among the inner wall surfaces of the cavity.

Preferably, a central axis of the pin mounting hole is roughly perpendicular to the side-wall surface in which the pin mounting hole is formed.

Preferably, the pin member is circular or polygonal in cross-section.

Preferably, the pin member is mounted in the pin mounting hole.

Preferably, injection molding of the injection-molded article is carried out by using the above-described mold for injection molding.

Preferably, an injection-molded article is injection-molded by using the above-described mold for injection molding.

Preferably, an injection molding machine includes the above-described mold for injection molding, means for clamping and opening the mold for injection molding, and melted-resin supply means for supplying a melted resin into the mold for injection molding.

According to the present invention, the injection-molded article can be removed from the mold for injection molding without problems even when the cavity-side end of the pin member, which is inserted into the pin mounting hole, protrudes from the side-wall surface to some extent or is positioned at a place recessed from the side-wall surface to some extent.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

[First Exemplary Embodiment]

A first exemplary embodiment according to the present invention is explained hereinafter with reference to FIGS. 12 to 17. Note that part of the explanation that is the same as part of the explanation made above with reference to FIGS. 1 to 4 may be omitted as appropriate.

Figure 1:
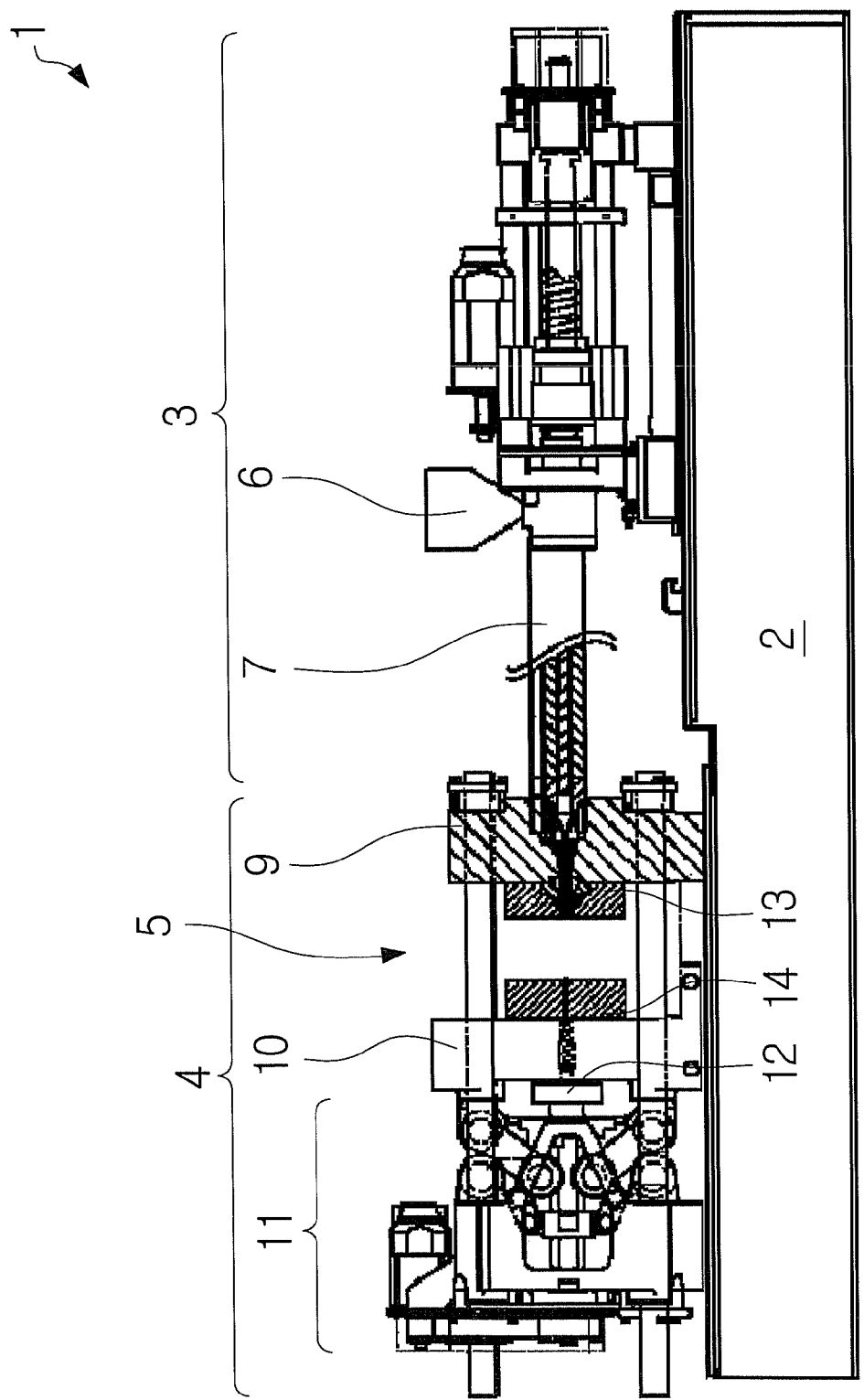
FIG. 1 is a schematic structural diagram of an injection molding machine.
Figure 2:
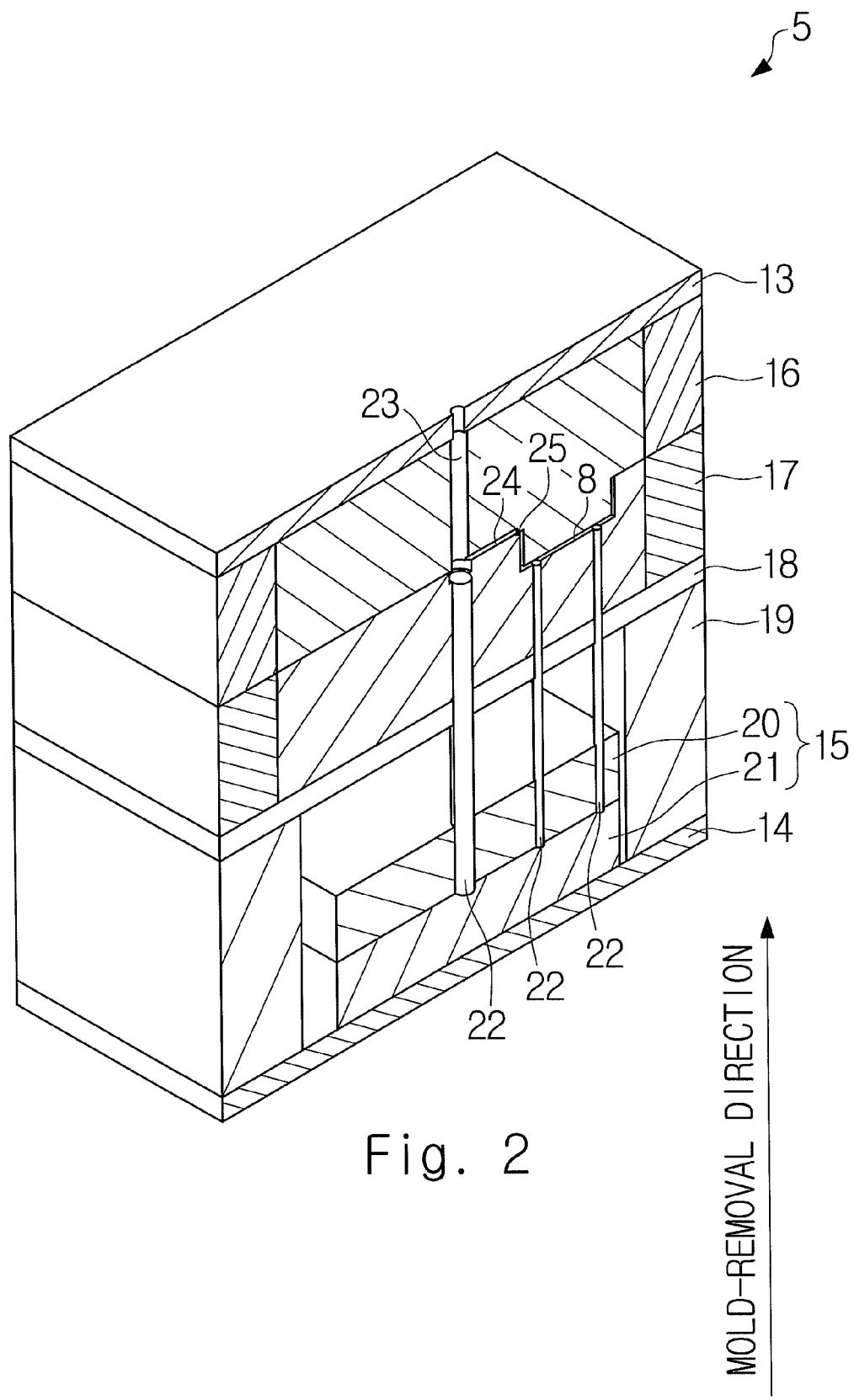
FIG. 2 is a cross-sectional perspective view of a mold for injection molding.
Figure 3:
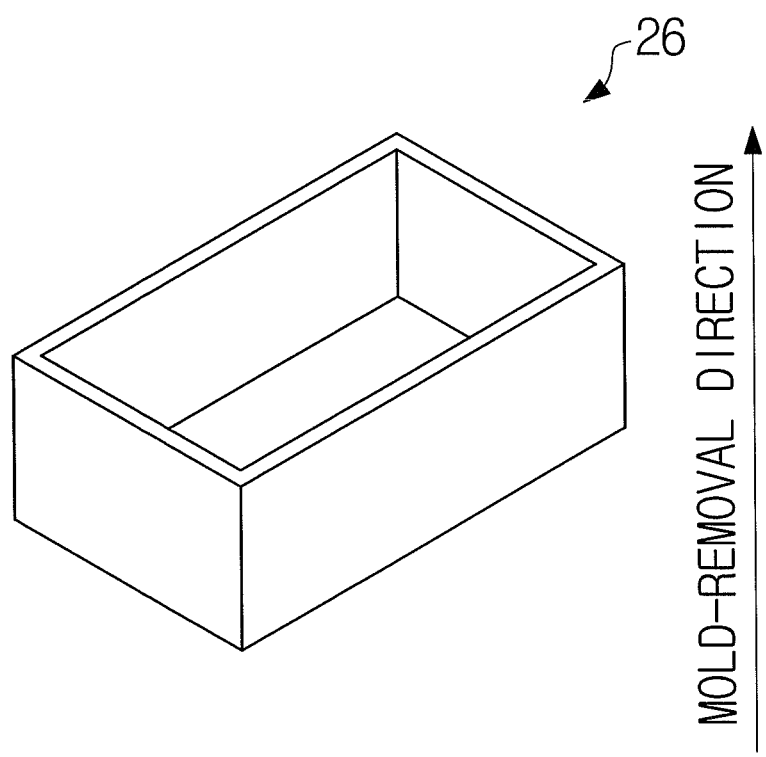
FIG. 3 is a perspective view of an injection-molded article.
Figure 4:
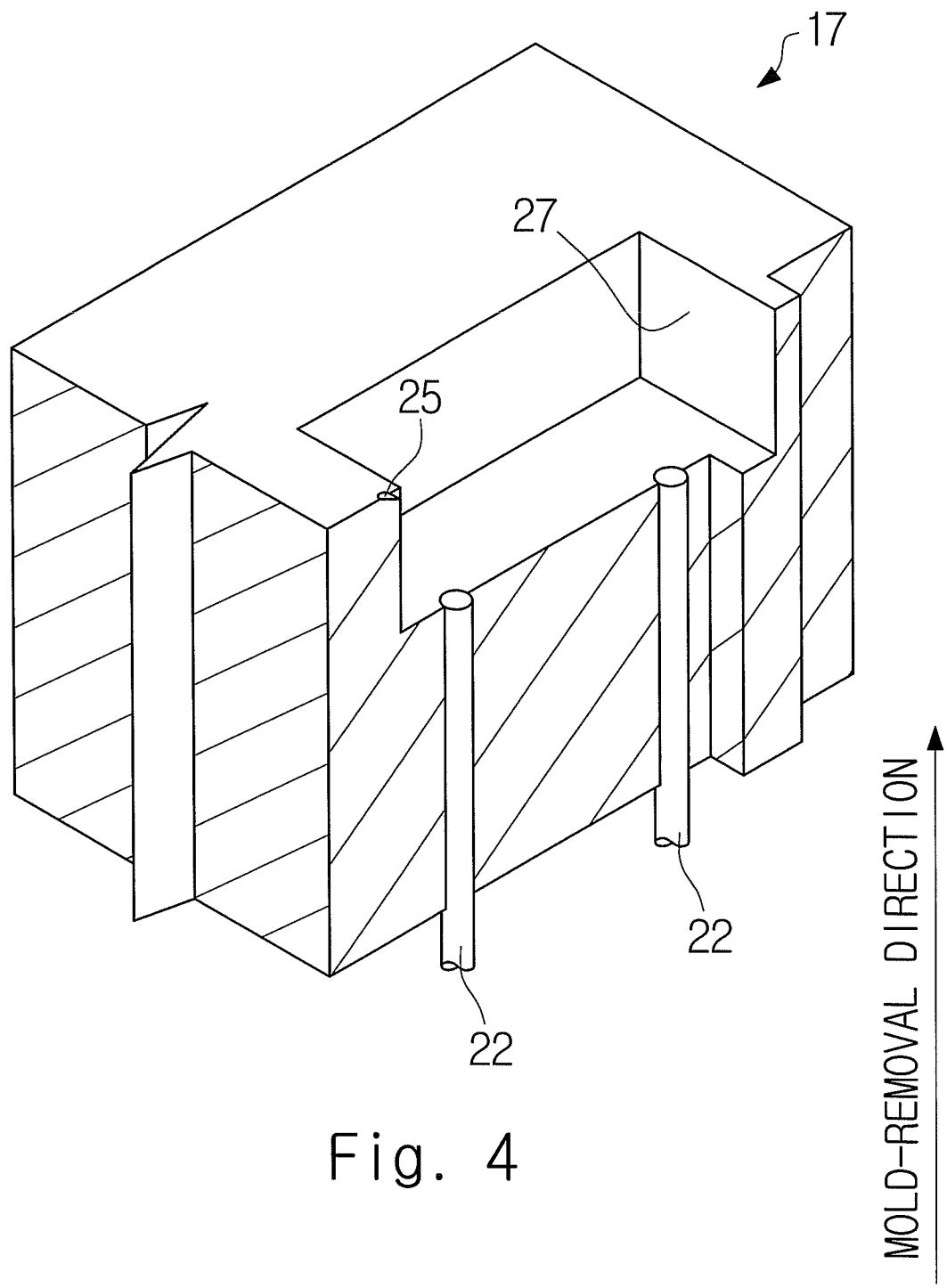
FIG. 4 is a perspective view of a portion cut away from a movable-side mold plate of a mold for injection molding.
Figure 5:
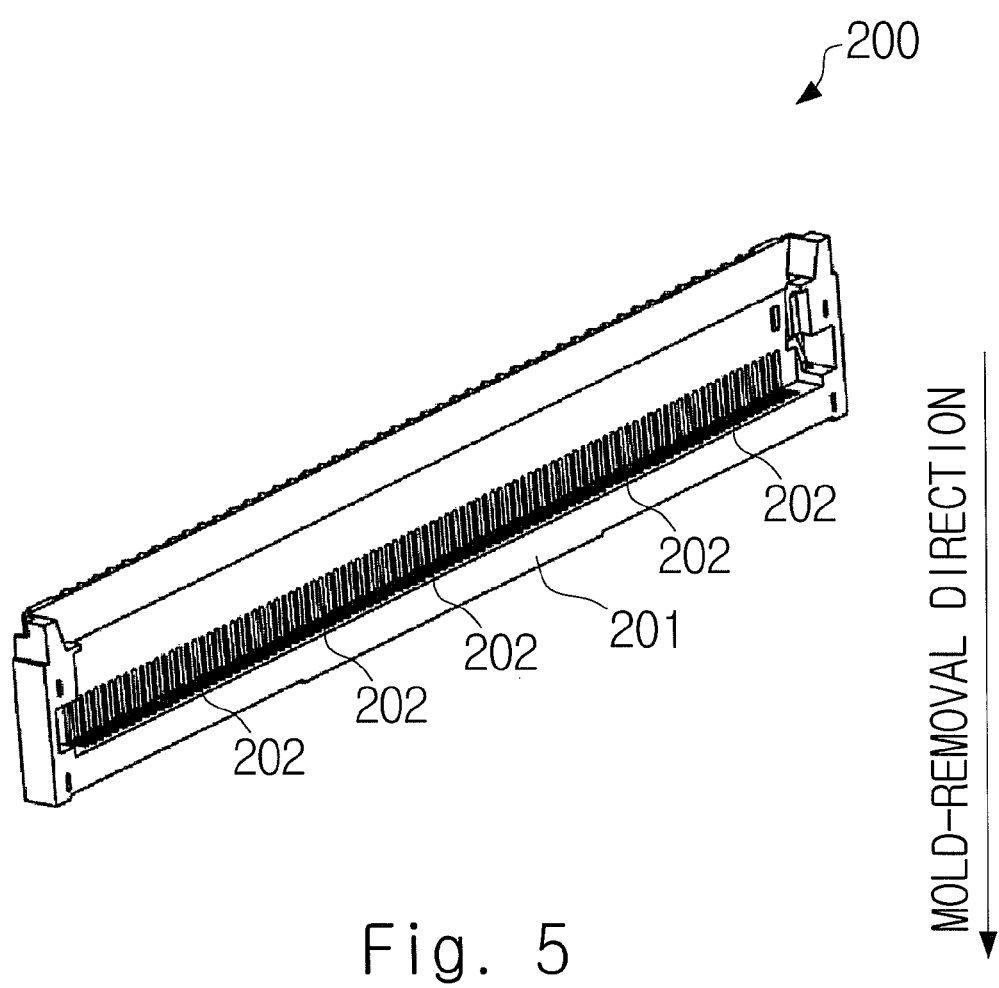
FIG. 5 is a perspective view of a housing of an FPC connector.
Figure 6:
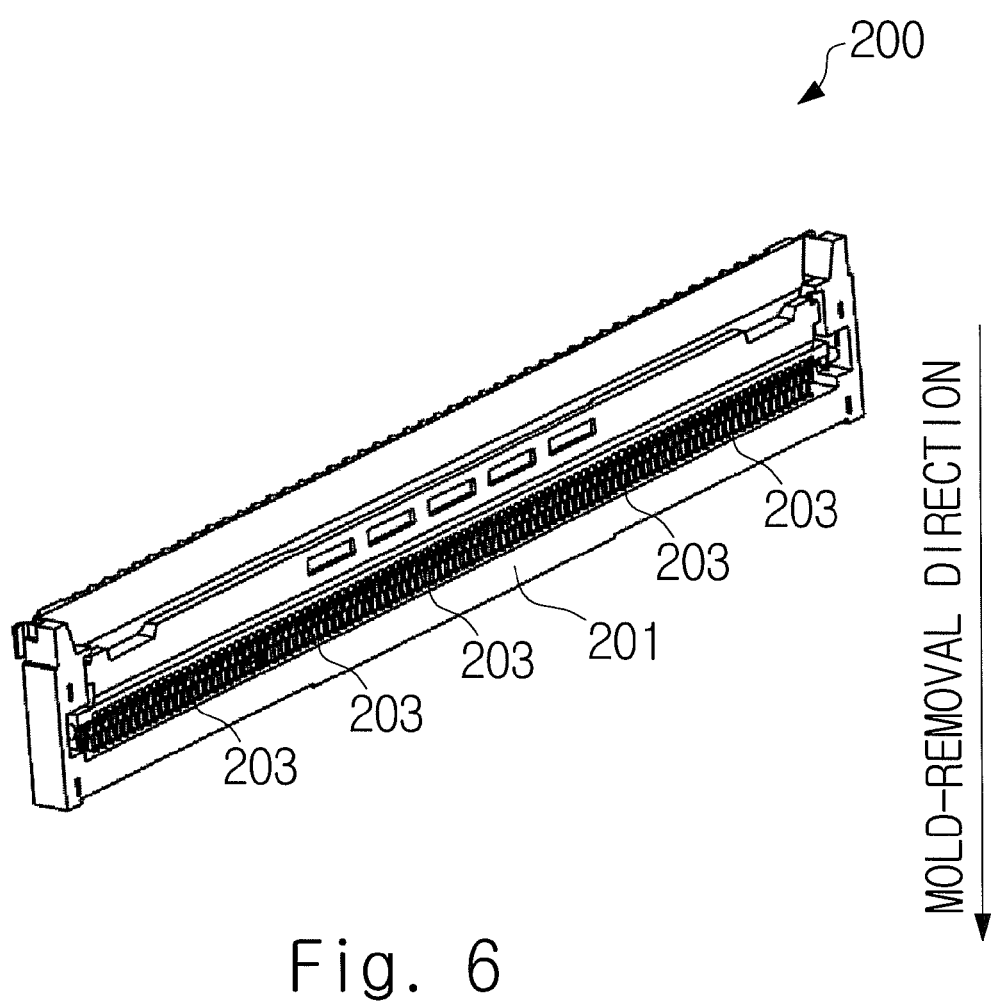
FIG. 6 is a perspective view of an FPC connector.
Figure 7:
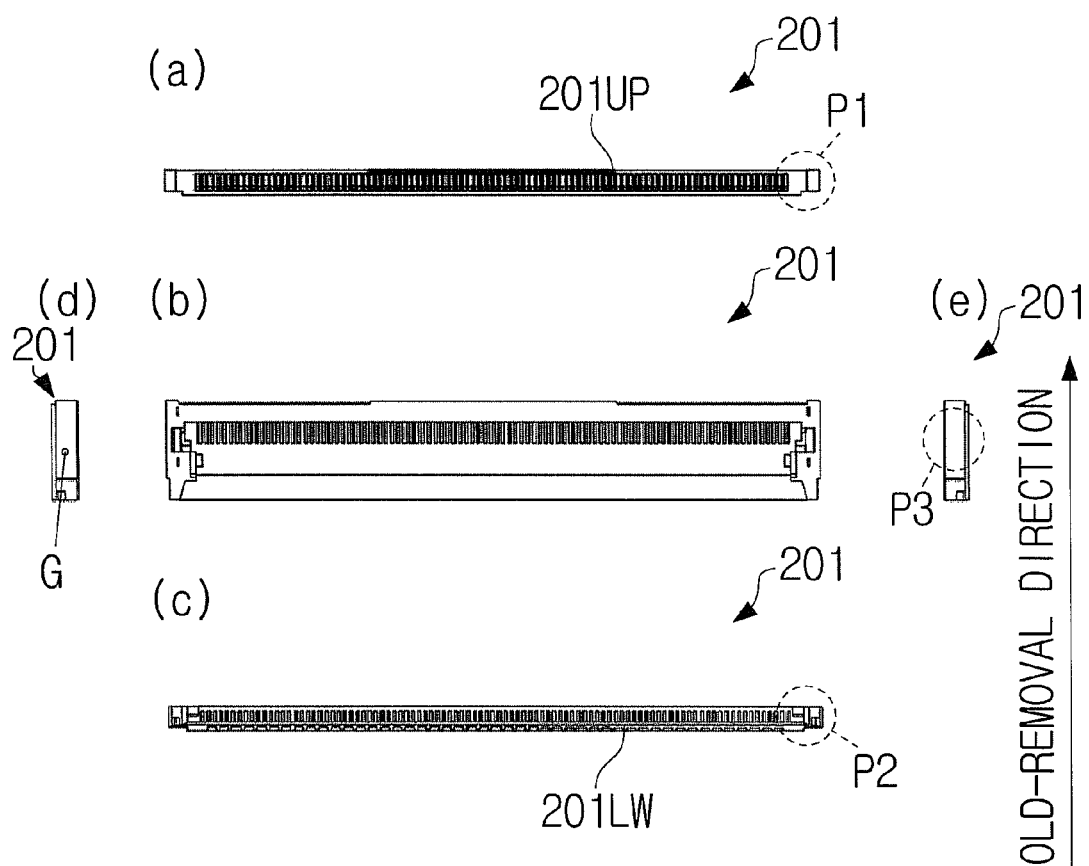
FIG. 7 is a housing of an FPC connector; (a) is a plane view of the housing of the FPC connector; (b) is a front view of the housing of the FPC connector; (c) is a bottom view of the housing of the FPC connector; (d) is a left-side view of the housing of the FPC connector; (e) is a right-side view of the housing of the FPC connector.
Figure 8:
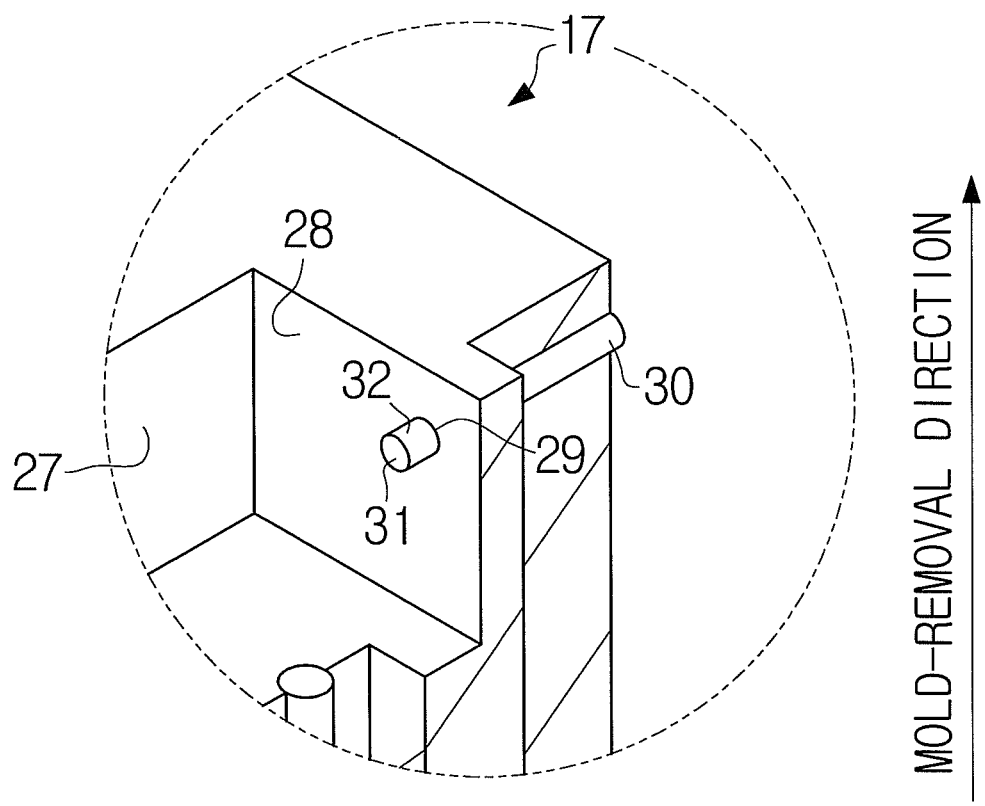
FIG. 8 is a cross-sectional perspective view of a portion cut away from a movable-side mold plate of a comparative example mold for injection molding, and is shown for explaining a problem to be solved.
Figure 9:
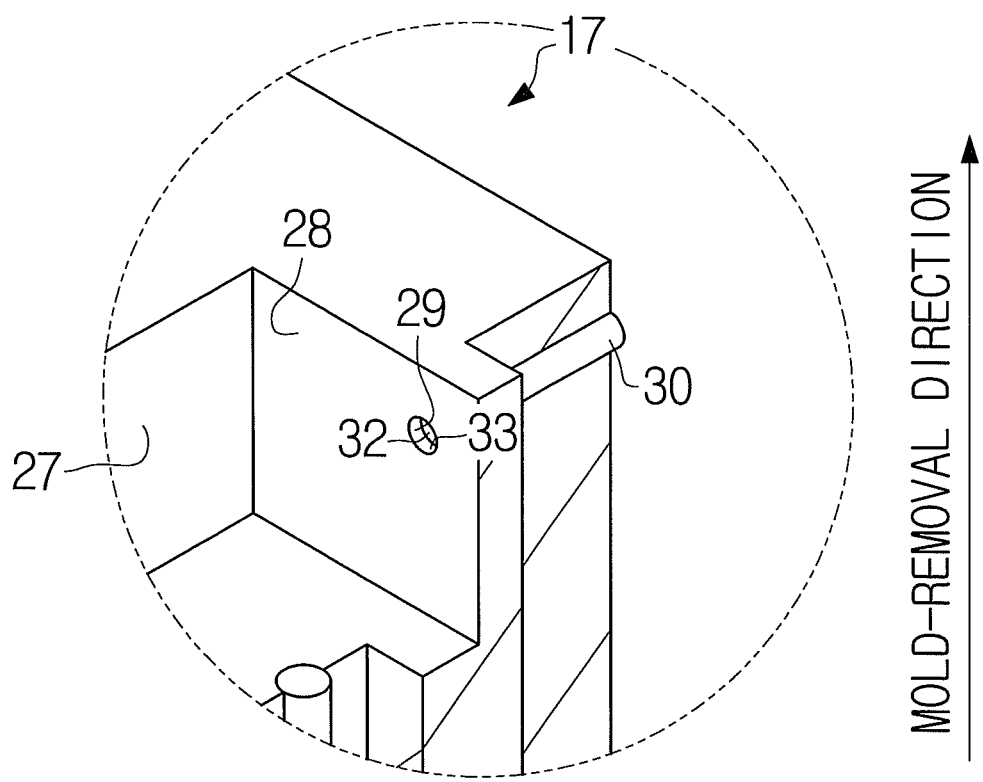
FIG. 9 is a cross-sectional perspective view of a portion cut away from a movable-side mold plate of a comparative example mold for injection molding, and is shown for explaining a problem to be solved.
Figure 10:
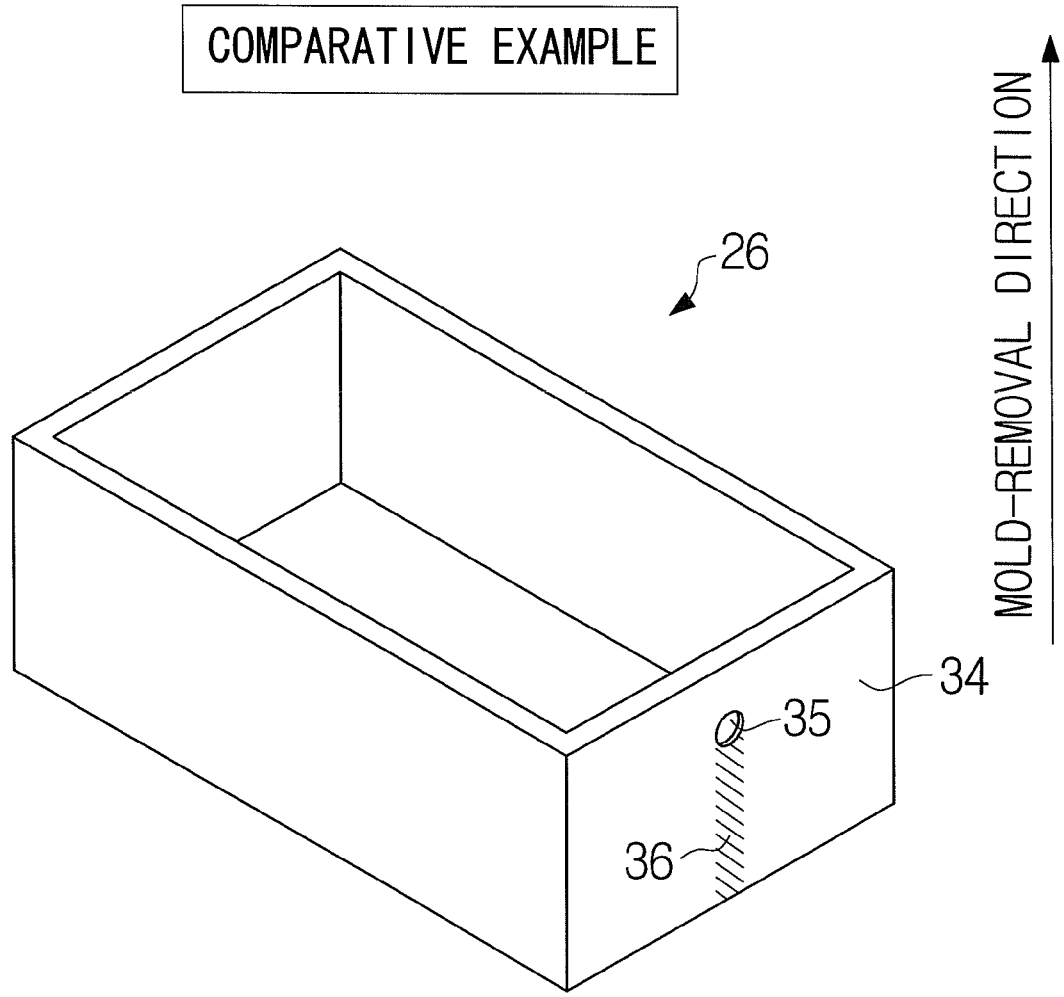
FIG. 10 is a perspective view of a comparative example mold for injection molding, and is shown for explaining a problem to be solved.
Figure 11:
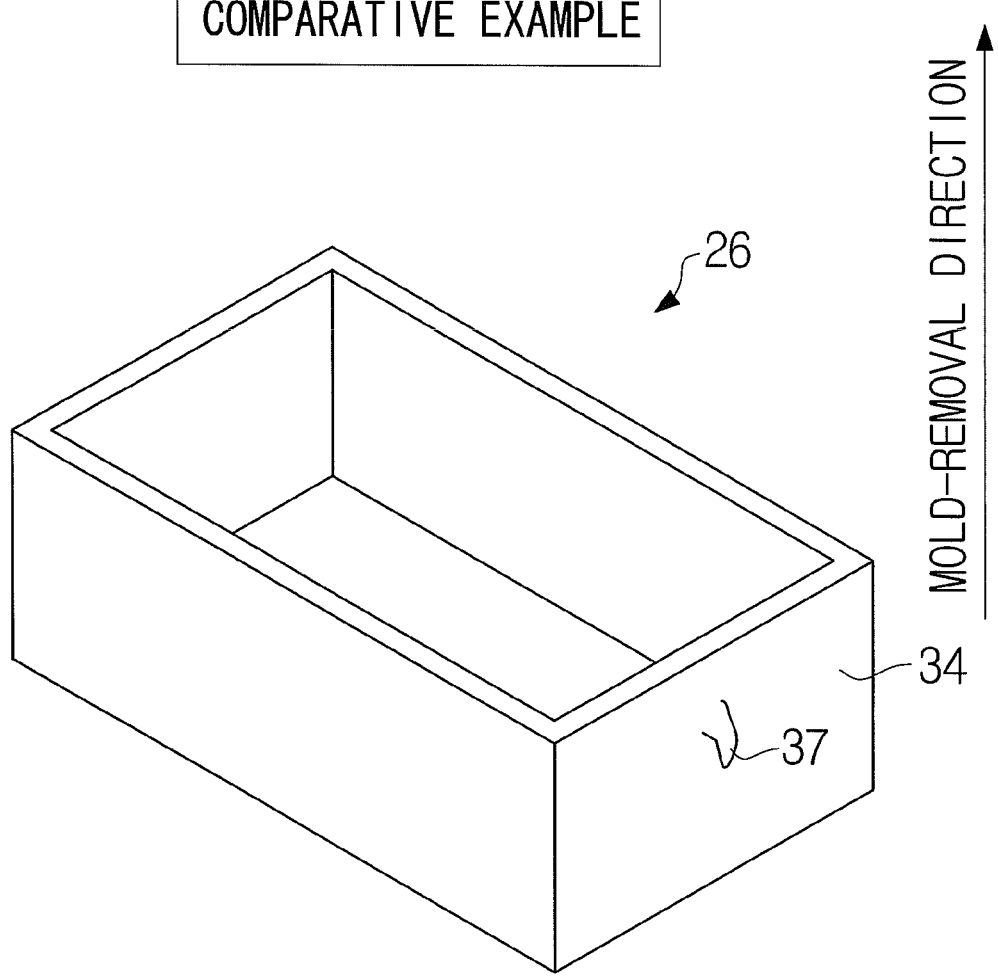
FIG. 11 is a perspective view of a comparative example mold for injection molding, and is shown for explaining a problem to be solved.
Figure 12:
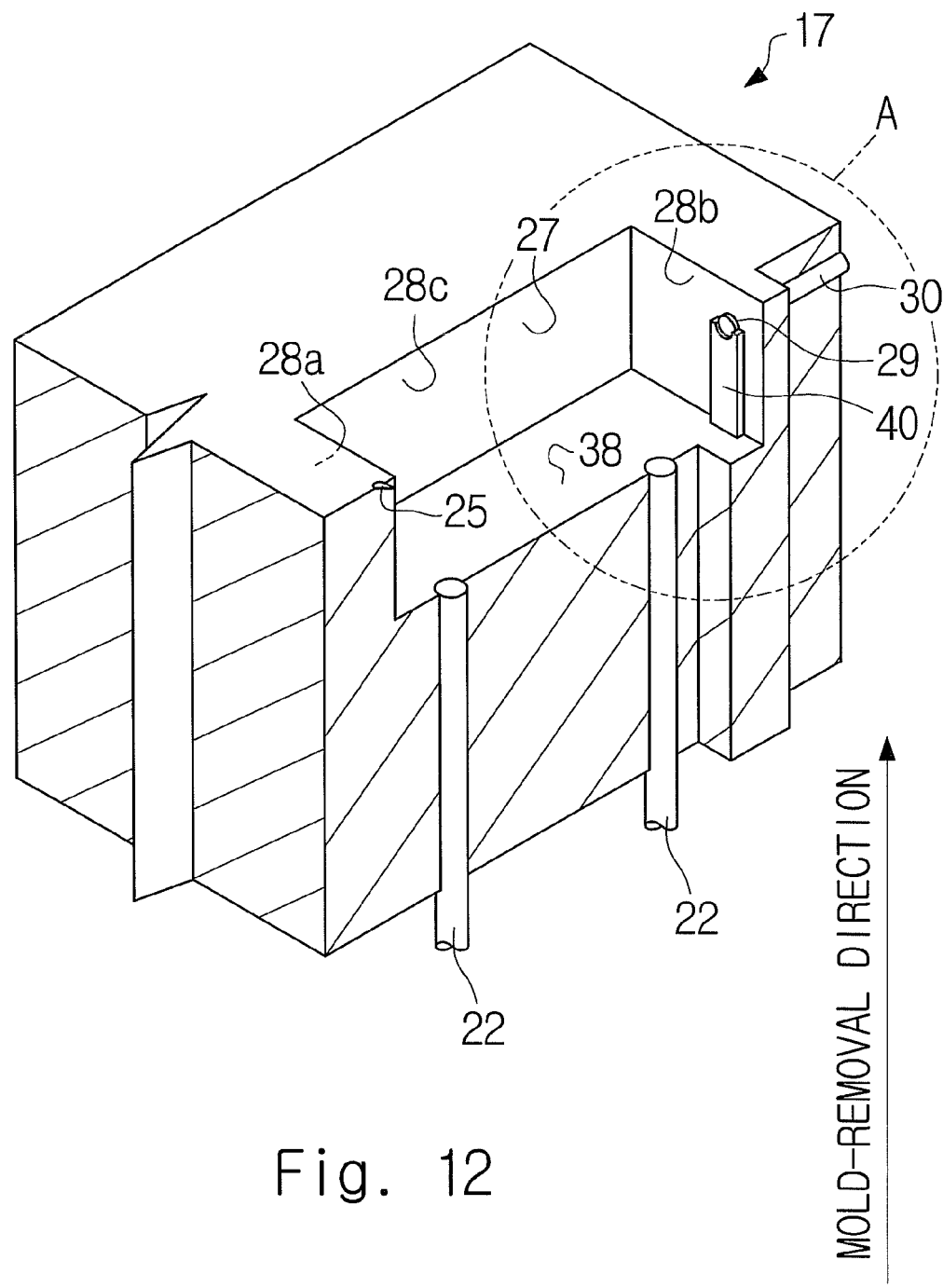
FIG. 12 is a perspective view of a portion cut away from a movable-side mold plate of a mold for injection molding (first exemplary embodiment)

In FIG. 12, a first side-wall surface 28a, a second side-wall surface 28b, a third side-wall surface 28c, and a bottom surface 38 are drawn as inner wall surfaces of the cavity 8 (also refer to FIG. 2). Each of the first side-wall surface 28a, the second side-wall surface 28b, the third side-wall surface 28c, and the bottom surface 38 is one of the surfaces that partition the cavity 8.

The bottom surface 38 is a surface perpendicular to the mold-removal direction of the injection-molded article 26 from the movable-side mold plate 17 (mold for injection molding 5). Although each of the first side-wall surface 28a, the second side-wall surface 28b, and the third side-wall surface 28c is configured so as to have a certain draft angle with respect to the mold-removal direction of the injection-molded article 26 from the movable-side mold plate 17 in practice, it can be still safely assumed that they are roughly parallel to the mold-removal direction of the injection-molded article 26 from the movable-side mold plate 17. A gate 25 is connected to the first side-wall surface 28a. The second side-wall surface 28b is a surface opposed to the first side-wall surface 28a. The second side-wall surface 28b is the inner wall surface corresponding to the charging end among the inner wall surfaces of the cavity 8. That is, the second side-wall surface 28b is the inner wall surface that is located farther from the first side-wall surface 28a (gate 25) than any other inner wall surfaces of the cavity 8. The third side-wall surface 28c is a surface roughly perpendicular to the first and second side-wall surfaces 28a and 28b. The third side-wall surface 28c adjoins to both the first and second side-wall surfaces 28a and 28b.

Figure 13:
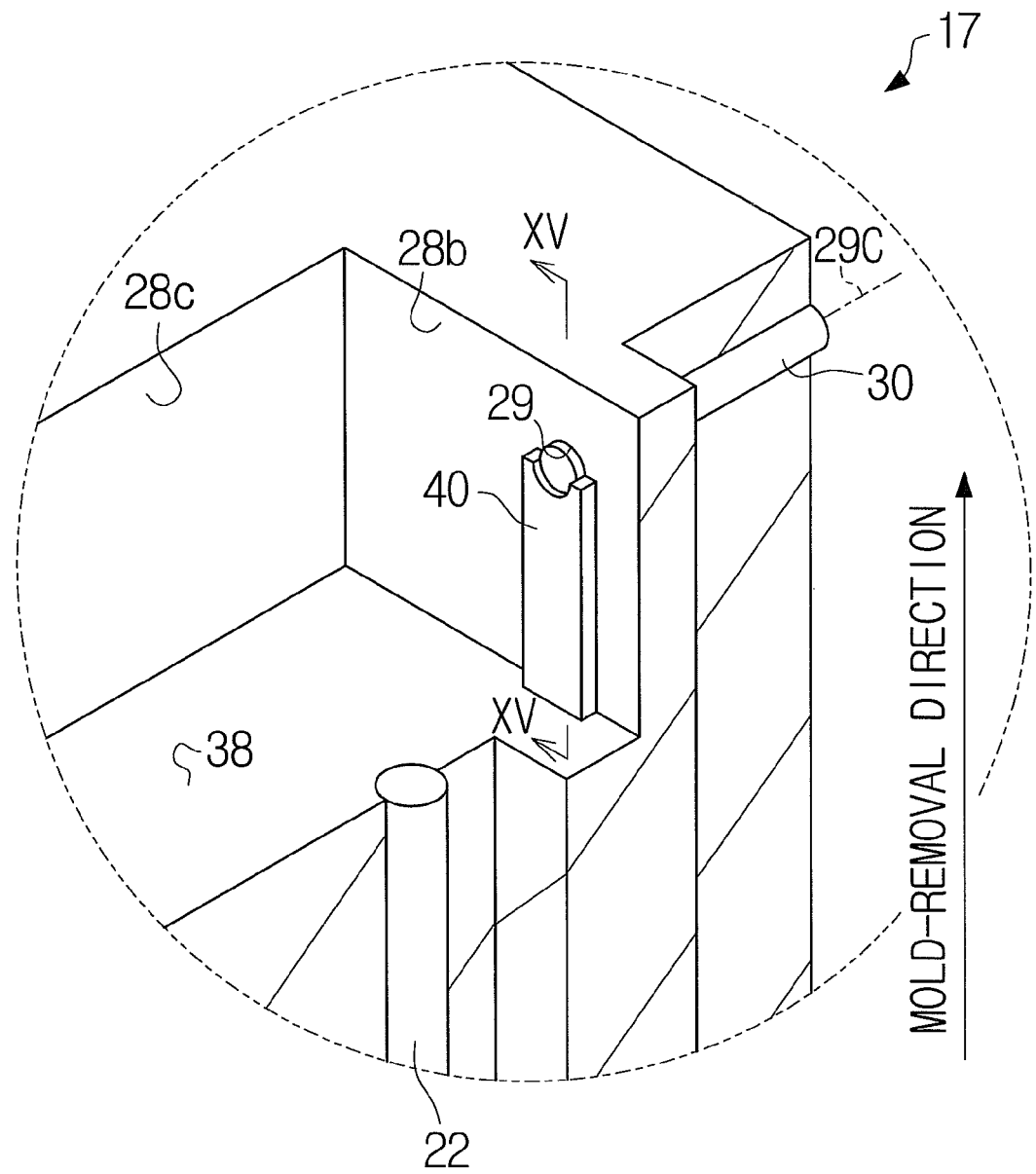
FIG. 13 is an enlarged view of a portion A shown in FIG. 12 (first exemplary embodiment)

As shown in FIGS. 12 and 13, a pin mounting hole 29 in which a pin-shaped pin member 30 is inserted and mounted is formed in the second side-wall surface 28b. As shown in FIG. 13, the pin mounting hole 29 is formed at a place that is away from the bottom surface 38 by a certain distance. The central axis 29C of the pin mounting hole 29 is roughly perpendicular to the second side-wall surface 28b. The pin member 30 is inserted and mounted in the pin mounting hole 29. In this exemplary embodiment, the pin member 30 is circular in cross-section.

Figure 14:
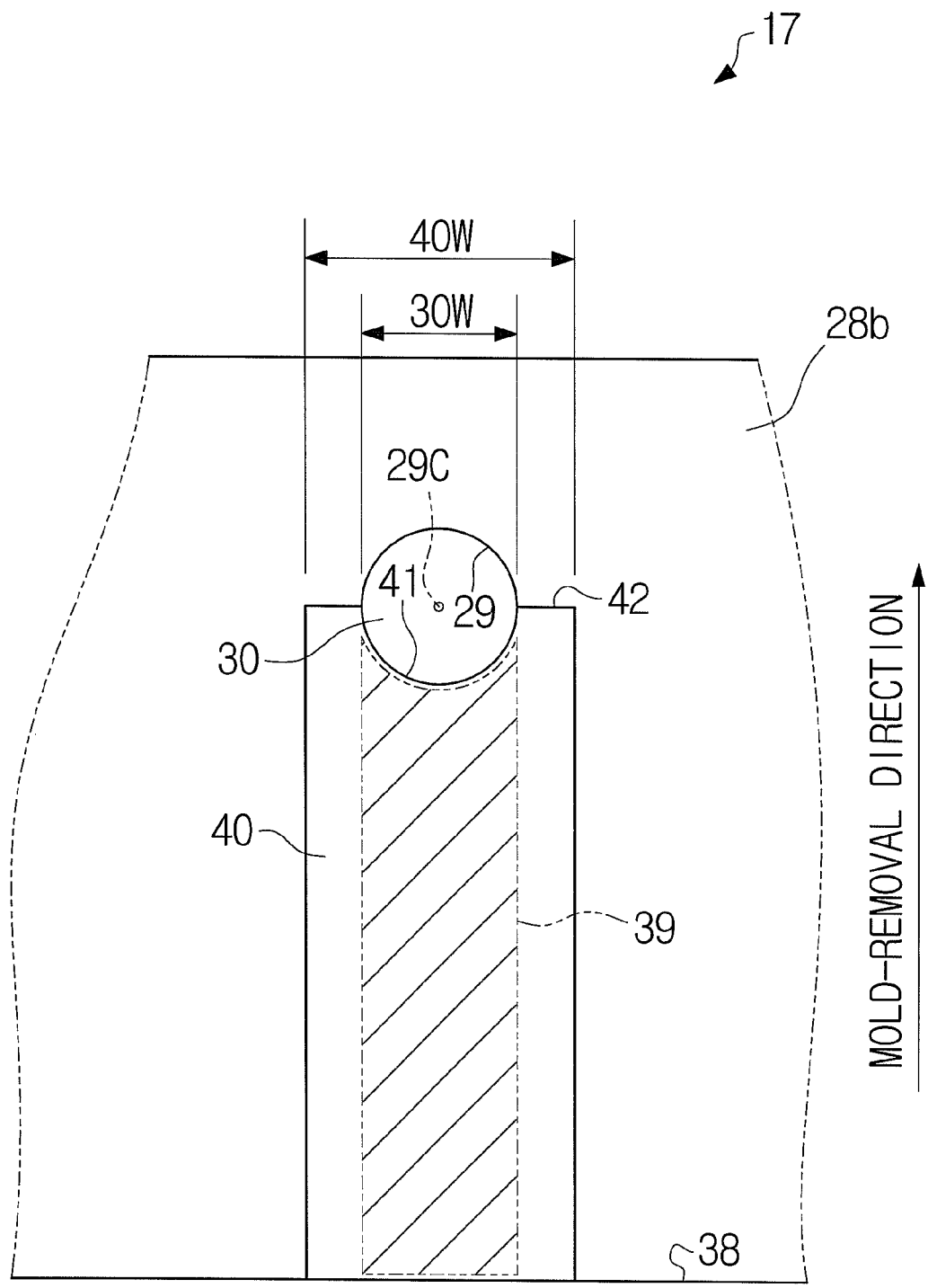
FIG. 14 is an enlarged front view of a protruding portion (first exemplary embodiment)
Figure 15:
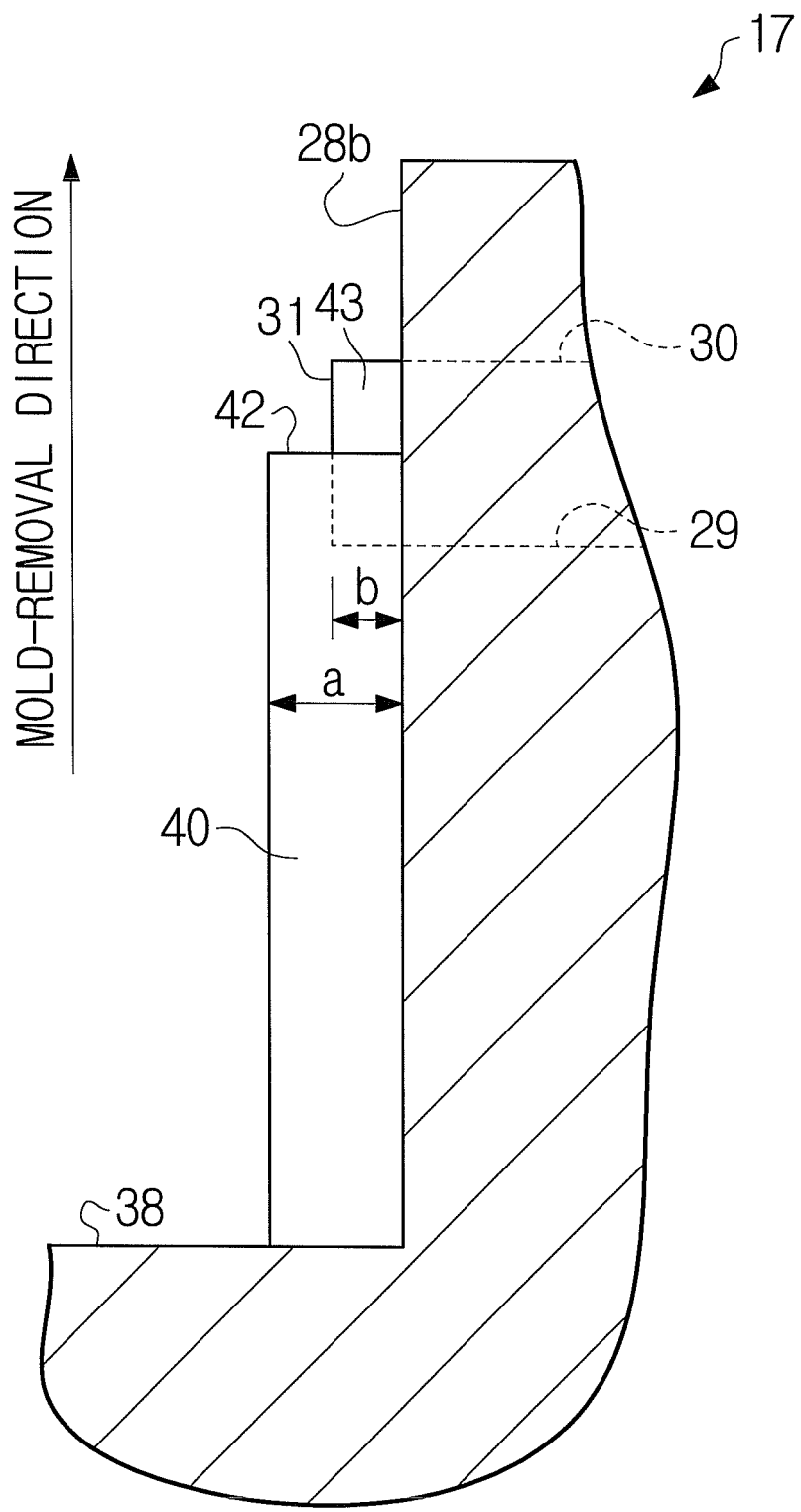
FIG. 15 is a cross section as viewed in the direction of XV-XV line arrow shown in FIG. 13 (first exemplary embodiment)
Figure 16:
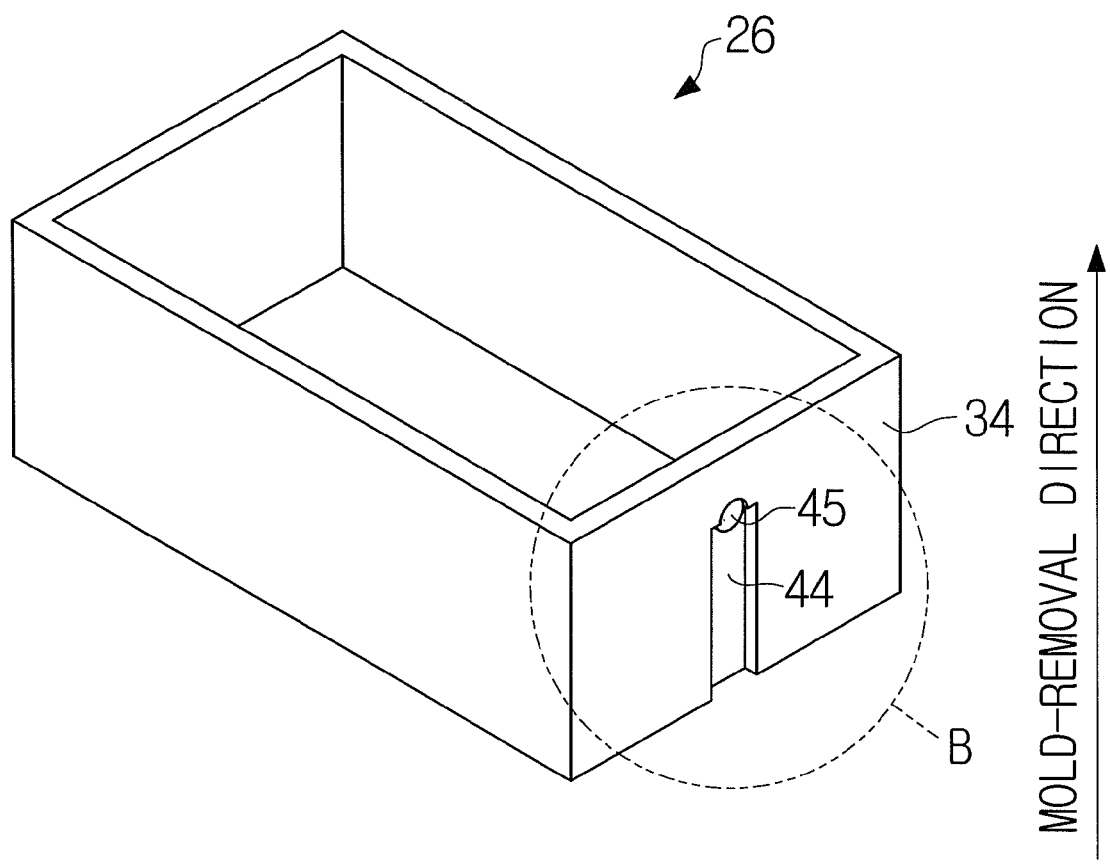
FIG. 16 is a perspective view of an injection-molded article (first exemplary embodiment)
Figure 17:
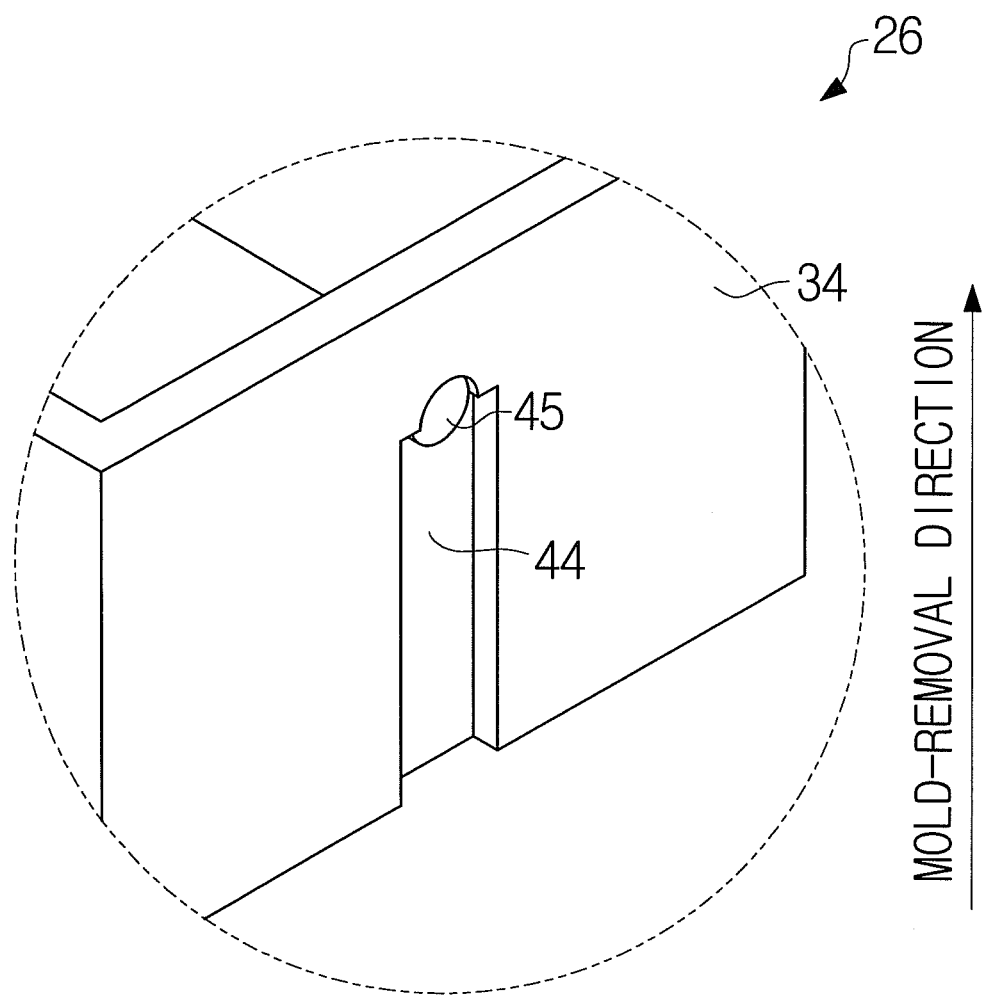
FIG. 17 is an enlarged view of a portion B shown in FIG. 16 (first exemplary embodiment)

Then, as shown in FIGS. 13 and 14, on the second side-wall surface 28b, a protruding portion 40 protruding from the second side-wall surface 28b into the cavity 8 side is formed in a surface area 39 located on the opposite side in the mold-removal direction with respect to the pin mounting hole 29. The protruding portion 40 has, for example, a rectangular parallelepiped shape with a thickness of about 100 micrometers. Further, a cutout 41 is formed in the area that coincides with the pin mounting hole 29 as the second side-wall surface 28b is viewed from the front as shown in FIG. 14. The end face 42 of the protruding portion 40 in the mold-removal direction is located at the same height as the central axis 29C of the pin mounting hole 29. That is, the position of the end face 42 of the protruding portion 40 in the mold-removal direction coincides with the position of the central axis 29C of the pin mounting hole 29 in the mold-removal direction. Further, the protruding portion 40 embraces the surface area 39 as the second side-wall surface 28b is viewed from the front as shown in FIG. 14. In particular, the width 40W of the protruding portion 40 that is specified in the direction perpendicular to the mold-removal direction as the second side-wall surface 28b is viewed from the front as shown in FIG. 14 is determined so as to be equal to or greater than the width 30W of the pin member 30 that is specified in the direction perpendicular to the mold-removal direction as the second side-wall surface 28b is viewed from the front as shown in FIG. 14. Therefore, as shown in FIG. 15, even if the end face 31 of the pin member 30 is not flush with the second side-wall surface 28b and the end portion 43 of the pin member 30 protrudes from the second side-wall surface 28b into the cavity 8 side by about 50 micrometers, for example, the so-called "undercut portion" is never formed in the injection-molded article 26 as shown in FIGS. 16 and 17. Note that in the example shown in FIG. 15, the height "a" of the protruding portion 40 with respect to the second side-wall surface 28b is set to a value greater than the height "b" of the end portion 43 of the pin member 30 with respect to the second side-wall surface 28b.

As shown in FIGS. 16 and 17, a roughly rectangular parallelepiped recessed portion 44, with which the protruding portion 40 had engaged, is formed in the outer wall surface 34 of the injection-molded article 26, which have been injection-molded by using the mold for injection molding 5 according to this exemplary embodiment. Further, when the end portion 43 of the pin member 30 protrudes from the second side-wall surface 28b into the cavity 8 side by a certain amount as shown in FIG. 15, a roughly-cylindrical recessed portion 45, with which the end portion 43 of the pin member 30 had engaged, is formed in the outer wall surface 34 of the injection-molded article 26 as shown in FIGS. 16 and 17. In the example shown in FIGS. 16 and 17, the recessed portion 44 and the recessed portion 45 are formed in a continuous fashion. Note that the thickness of the protruding portion 40 shown in FIG. 15 is set to a sufficiently large value so that the depth of the recessed portion 44, with which the protruding portion 40 engages, becomes larger than the depth of the recessed portion 45, with which the end portion 43 of the pin member 30 engages. Note that the "depth" is specified by using the second side-wall surface 28b as the reference surface.

To sum up, the first exemplary embodiment according to the present invention, which has been explained above, has the following characteristics.

That is, the mold for injection molding 5 including the stationary-side mold plate 16 and the movable-side mold plate 17, in which the cavity 8 is formed between the stationary-side mold plate 16 and the movable-side mold plate 17, and the injection-molded article 26 is injection-molded by charging this cavity 8 with a melted resin has the following features. The pin mounting hole 29 in which the pin-shaped pin member 30 is inserted and mounted is formed in the second side-wall surface 28b that is an inner wall surface other than the inner wall surfaces perpendicular to the mold-removal direction of the injection-molded article 26 among the inner wall surfaces of the cavity 8. On the second side-wall surface 28b, the protruding portion 40 protruding from the second side-wall surface 28b is formed in the surface area 39 located on the opposite side in the mold-removal direction with respect to the pin mounting hole 29. With the above-described structure, the injection-molded article 26 can be removed from the mold for injection molding 5 (movable-side mold plate 17) without problems even when the cavity-side end portion 43 of the pin member 30, which is inserted into the pin mounting hole 29, protrudes from the second side-wall surface 28b to some extent.

Note that there are cases in which the pin mounting hole 29 formed in the second side-wall surface 28b is used as a sensor mounting hole in order to detect that the cavity 8 is charged to the charging end with a melted resin. Examples of the "sensor" include a mold internal-pressure sensor and a resin temperature sensor. The mold internal-pressure sensor is composed of a sensor main body and a pin member. When the mold internal-pressure sensor is used, the pin member is inserted into the sensor mounting hole in advance and the end face of the pin member on the cavity 8 side is ground so that the end face becomes flush with the inner wall surface at the charging end of the cavity 8 as much as possible. With this structure, when the cavity 8 is charged to the charging end with a melted resin, the charging pressure of the melted resin affects the end face of the pin member and the sensor main body thereby detects the charging pressure of the melted resin through this pin member. When the sensor main body detects a charging pressure equal to or greater than a predetermined value, it determines that the cavity 8 has been properly charged with a melted resin. On the other hand, when the sensor main body does not detect the charging pressure equal to or greater than the predetermined value, it determines that the charging of the melted resin to the cavity 8 has been carried out abnormally. Similarly, the resin temperature sensor is composed of a sensor main body and a pin member. When the resin temperature sensor is used, the pin member is inserted into the sensor mounting hole in advance and the end face of the pin member on the cavity 8 side is ground so that the end face becomes flush with the inner wall surface at the charging end of the cavity 8 as much as possible. With this structure, when the cavity 8 is charged to the charging end with a melted resin, the high-temperature melted resin heats the end face of the pin member and a thermal electromotive force is thereby generated in the thermocouple embedded at or near the end face of this pin member. When the sensor main body detects a thermocouple voltage equal to or greater than a predetermined value, it determines that the cavity 8 has been properly charged with the melted resin. On the other hand, when the sensor main body does not detect the thermocouple voltage equal to or greater than a predetermined value, it determines that the charging of the melted resin to the cavity 8 has been carried out abnormally. Even when the pin mounting hole 29 formed in the second side-wall surface 28b is used as the sensor mounting hole in addition to or instead of the gas vent in this manner, the provision of the above-described protruding portion 40 is equally significant.

Note that although the pin mounting hole 29 is formed in the second side-wall surface 28b in this exemplary embodiment, the pin mounting hole 29 may be formed in the third side-wall surface 28c in other exemplary embodiments.

Further, in this exemplary embodiment, when the pin member 30 constitutes a part of a mold internal-pressure sensor, there is a problem that the measured internal pressure varies depending on the position of the end portion 43 of the pin member 30 within the cavity 8. If the pin member 30 is disposed in the slide core disclosed in Patent literature 1, the position of the end portion 43 of the pin member 30 within the cavity 8 is likely to change widely. In contrast to this, the pin member 30 can be fixed to the movable-side mold plate 17, instead of being disposed on the so-called slide core, in this exemplary embodiment, thereby contributing to the improvement of the accuracy of the mold internal-pressure measurement.

[Second Exemplary Embodiment]

Figure 18:
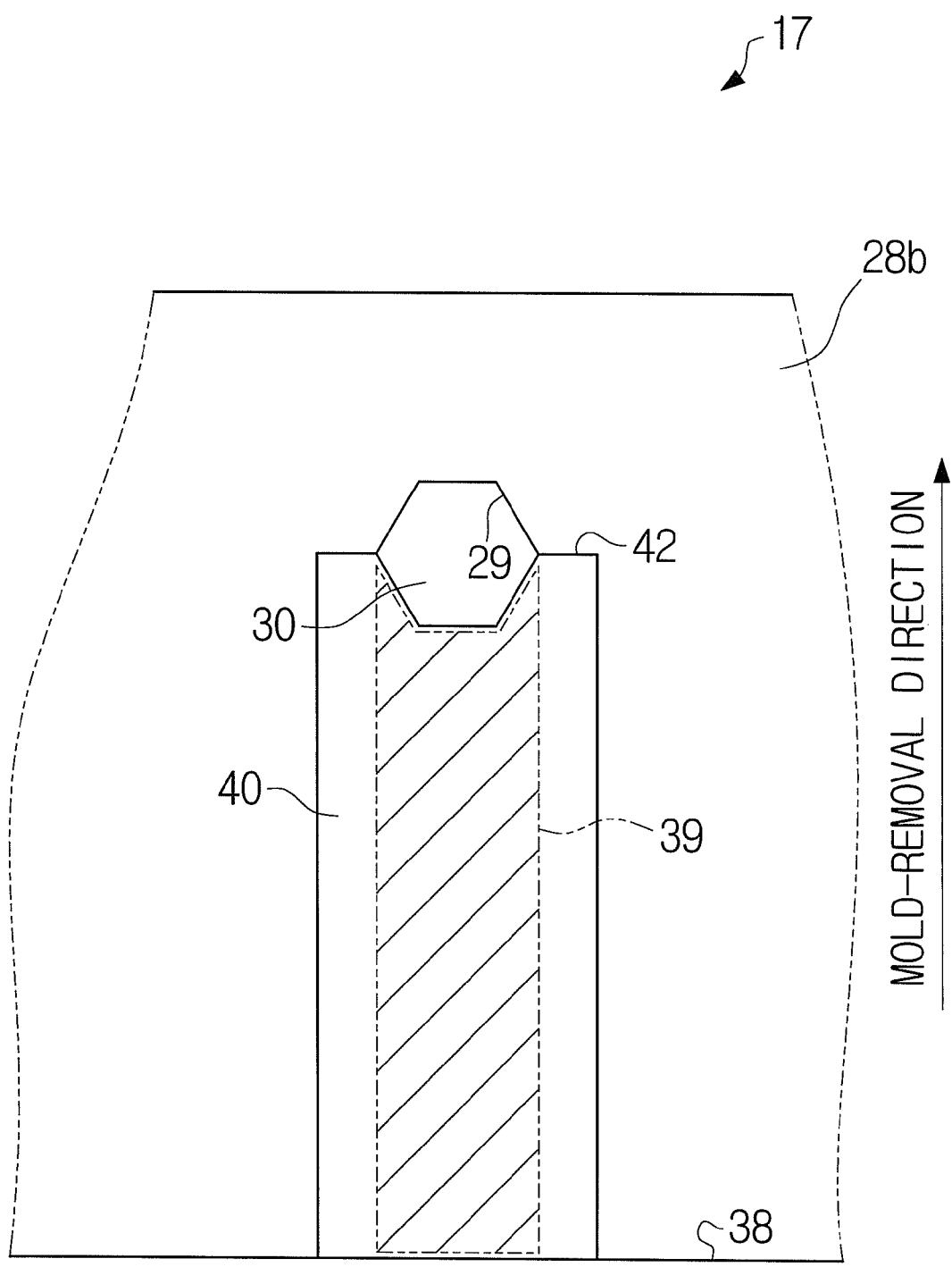
FIG. 18 is an enlarged front view of a protruding portion (second exemplary embodiment)

Next, a second exemplary embodiment according to the present invention is explained with reference to FIG. 18. The following explanation is made with a particular emphasis on differences of this exemplary embodiment from the above-described first exemplary embodiment, and duplicated explanation may be omitted as appropriate. Further, in principle, the same symbols are assigned to components corresponding to the respective components of the above-described first exemplary embodiment.

In the above-described first exemplary embodiment, the pin member 30 is circular in cross-section. However, the pin member 30 in this exemplary embodiment is polygonal in cross-section, and in particular regular hexagonal in cross-section. In concert with this feature, the pin mounting hole 29 is also polygonal, in particular regular hexagonal in cross-section in this exemplary embodiment.

[Third Exemplary Embodiment]

Figure 19:
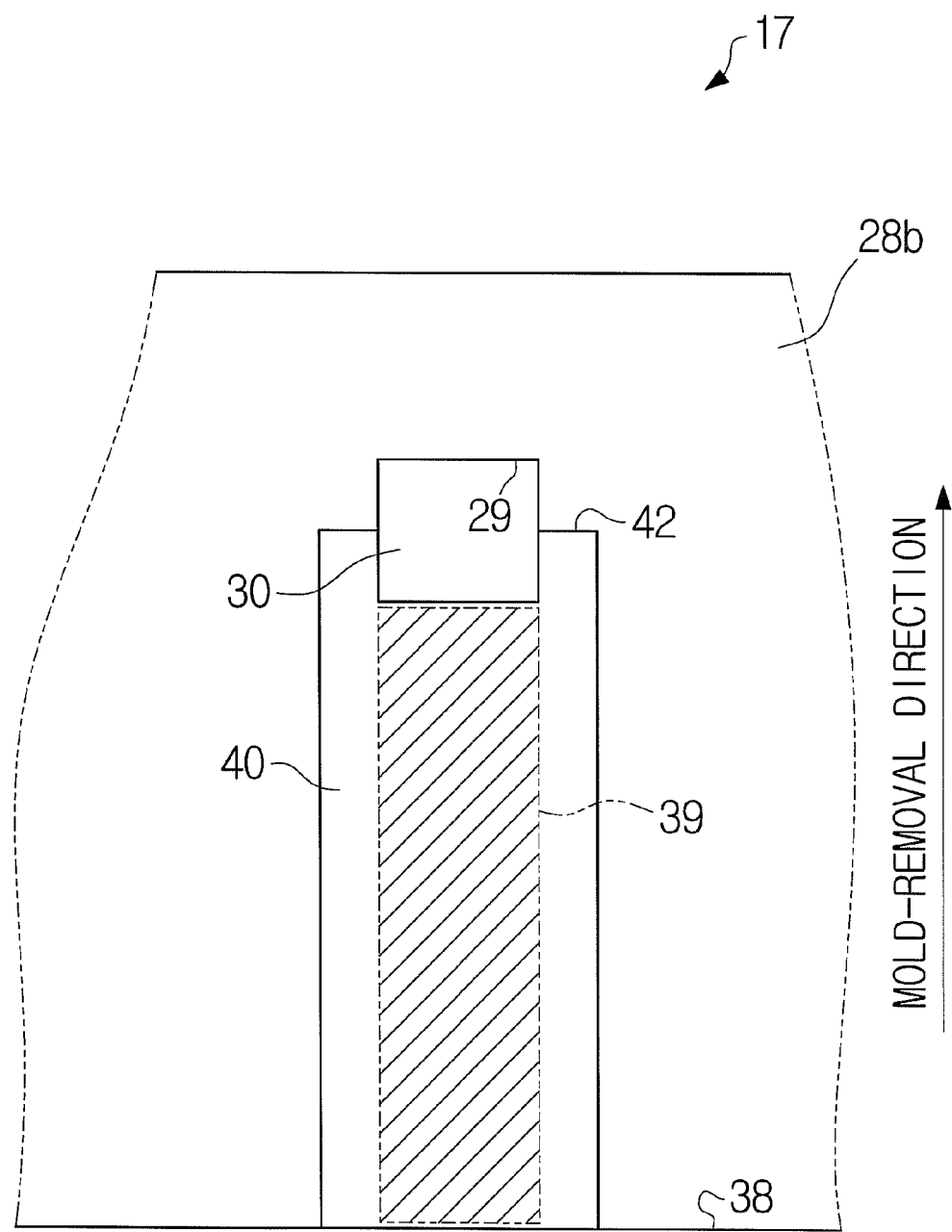
FIG. 19 is an enlarged front view of a protruding portion (third exemplary embodiment)

Next, a third exemplary embodiment according to the present invention is explained with reference to FIG. 19. The following explanation is made with a particular emphasis on differences of this exemplary embodiment from the above-described first exemplary embodiment, and duplicated explanation may be omitted as appropriate. Further, in principle, the same symbols are assigned to components corresponding to the respective components of the above-described first exemplary embodiment.

In the above-described first exemplary embodiment, the pin member 30 is circular in cross-section. However, the pin member 30 in this exemplary embodiment is polygonal, in particular rectangular in cross-section. In concert with this feature, the pin mounting hole 29 is also polygonal, in particular rectangular in cross-section in this exemplary embodiment.

[Fourth Exemplary Embodiment]

Next, a fourth exemplary embodiment according to the present invention is explained with reference to FIGS. 20 to 25. The following explanation is made with a particular emphasis on differences of this exemplary embodiment from the above-described first exemplary embodiment, and duplicated explanation may be omitted as appropriate. Further, in principle, the same symbols are assigned to components corresponding to the respective components of the above-described first exemplary embodiment.

Figure 20:
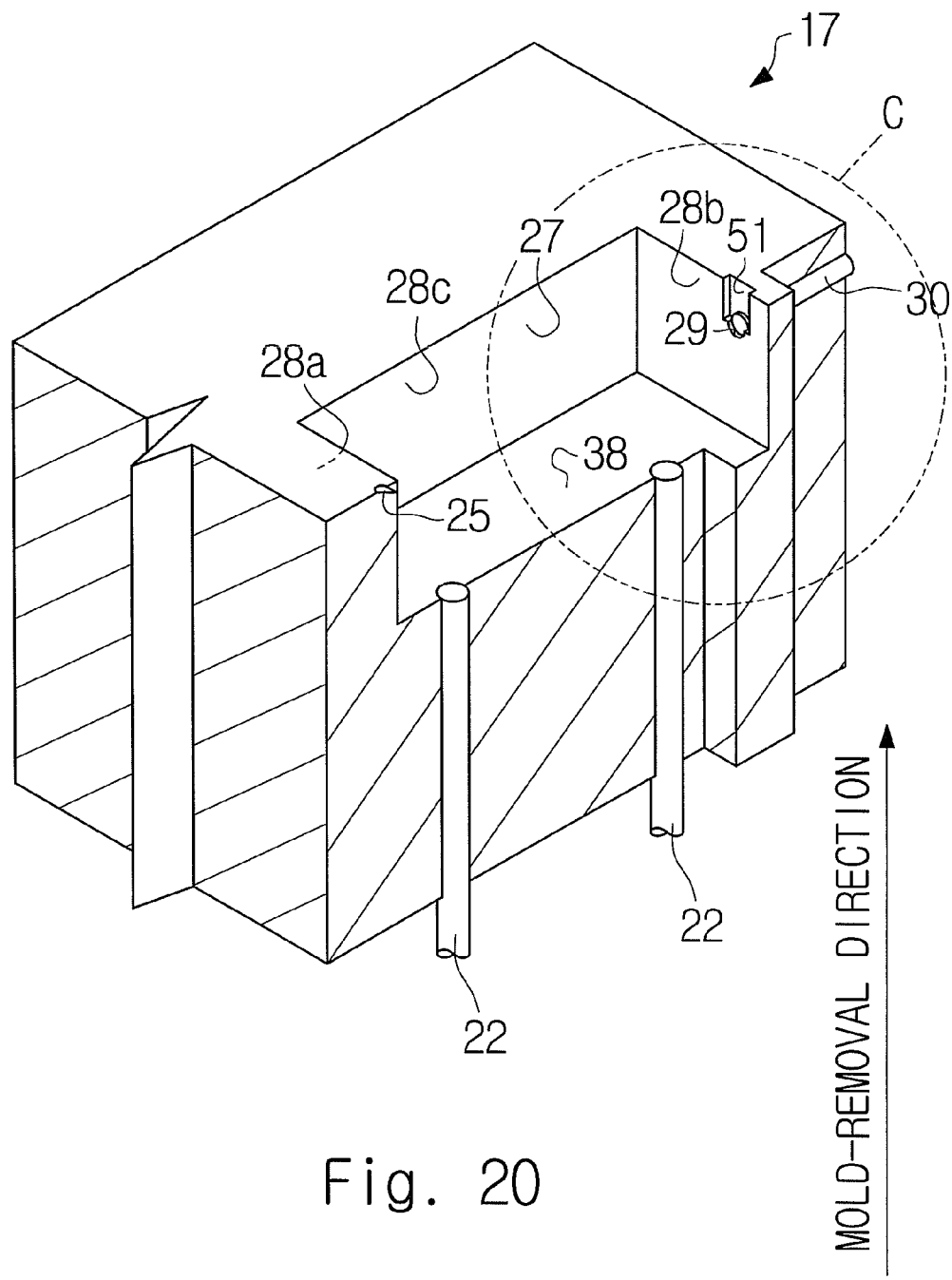
FIG. 20 is a perspective view of a portion cut away from a movable-side mold plate of a mold for injection molding (fourth exemplary embodiment)
Figure 21:
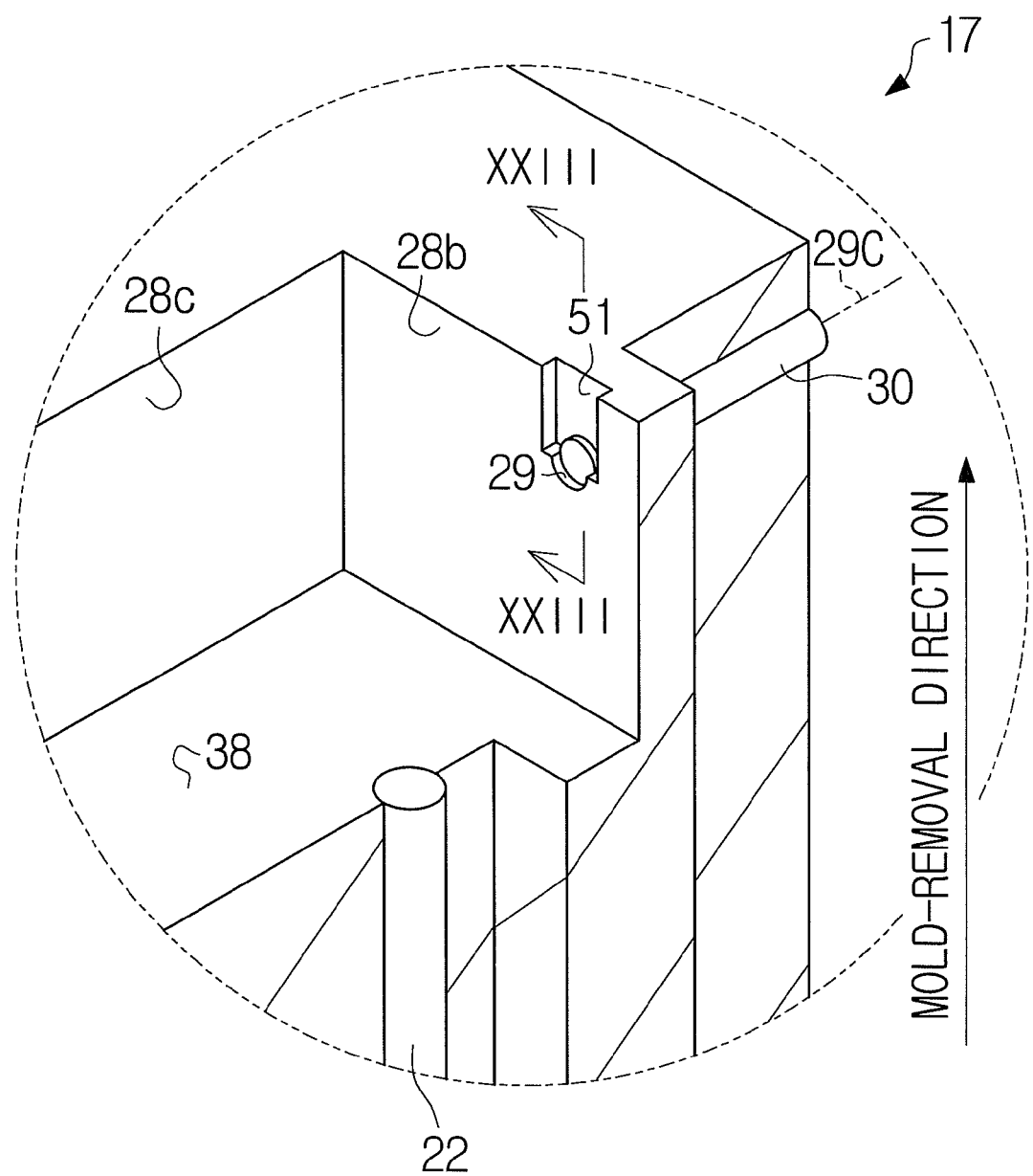
FIG. 21 is an enlarged view of a portion C shown in FIG. 20 (fourth exemplary embodiment)
Figure 22:
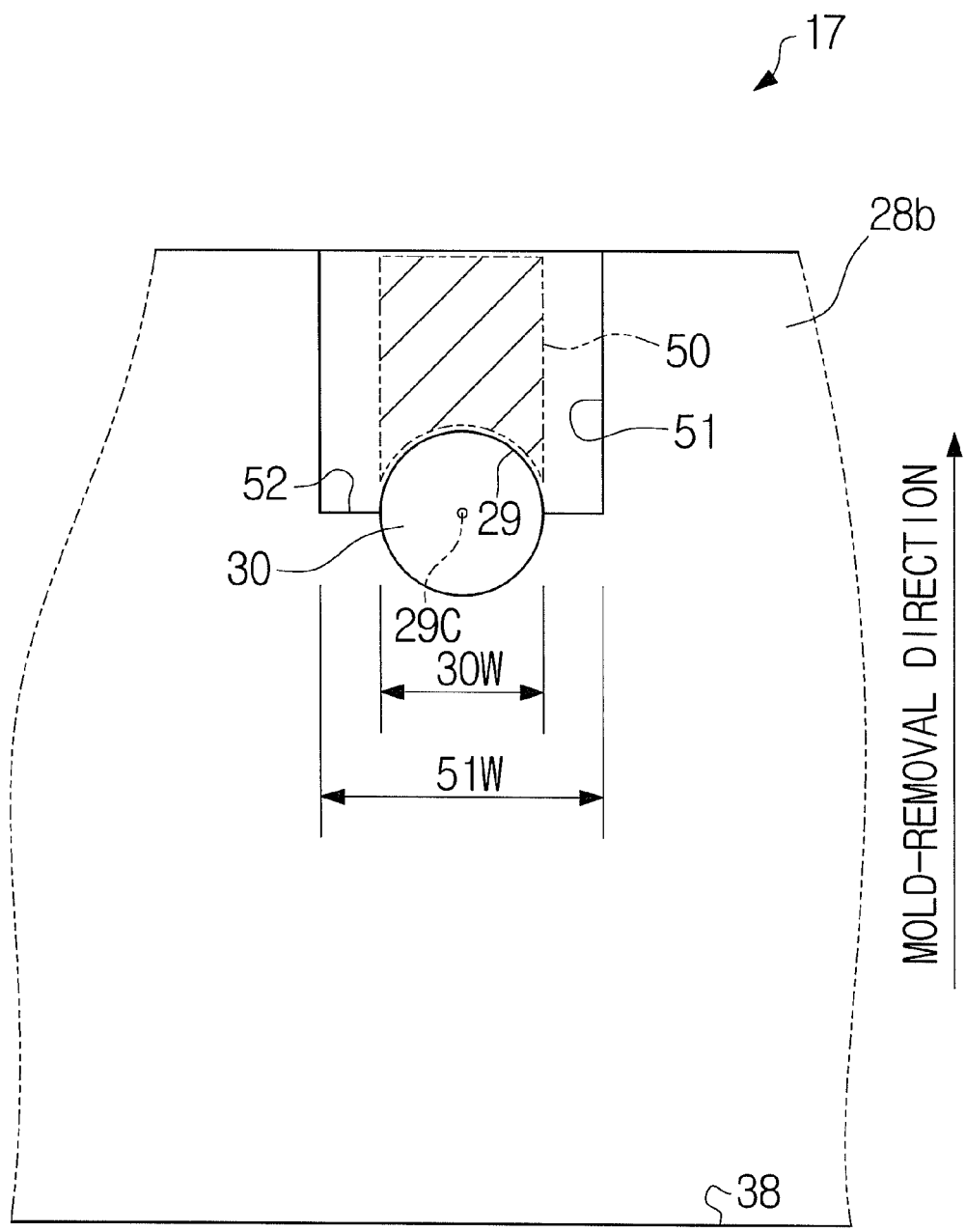
FIG. 22 is an enlarged front view of a recessed portion (fourth exemplary embodiment)
Figure 23:
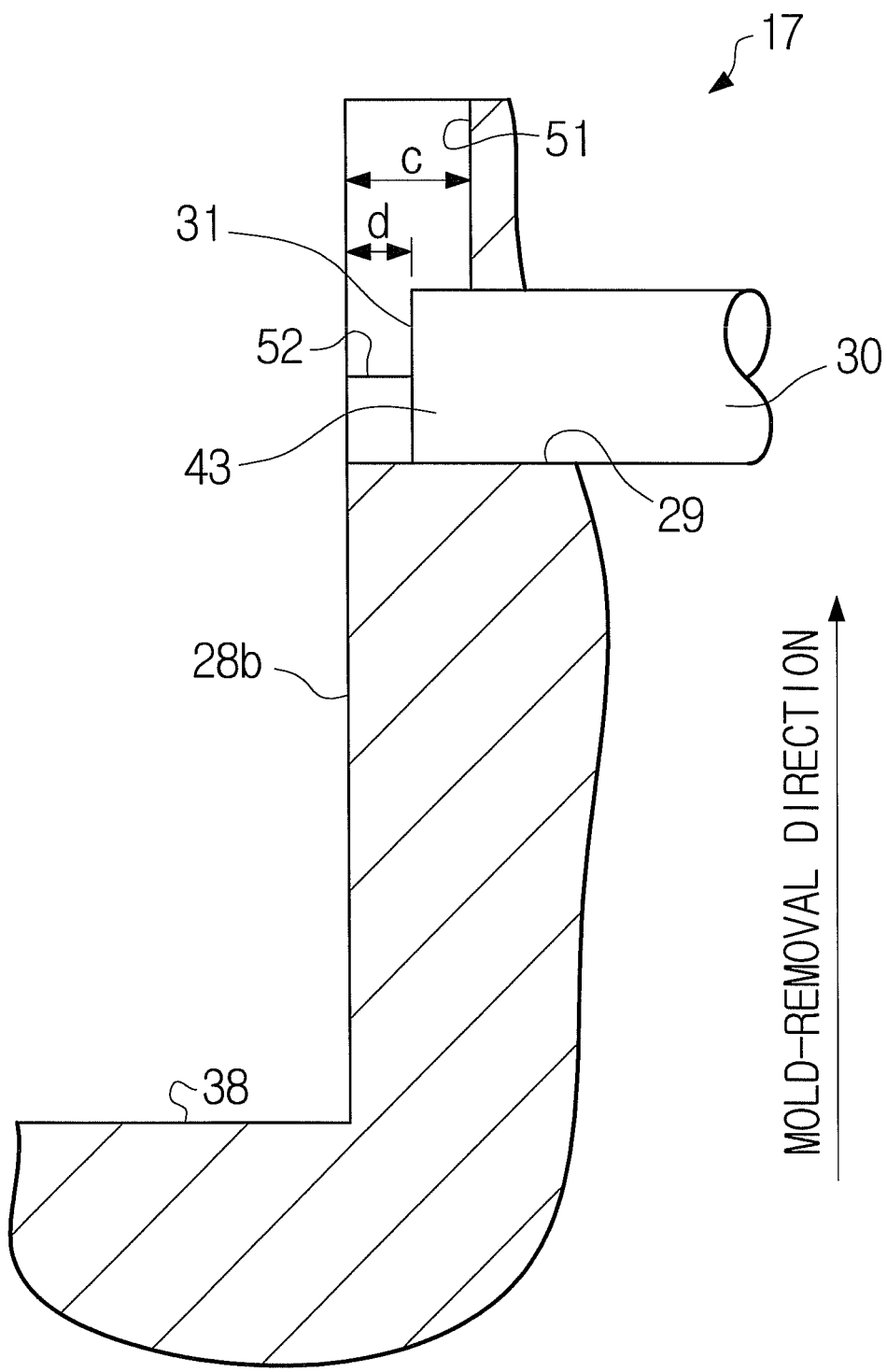
FIG. 23 is a cross section as viewed in the direction of XXIII-XXIII line arrow shown in FIG. 21 (fourth exemplary embodiment)
Figure 24:
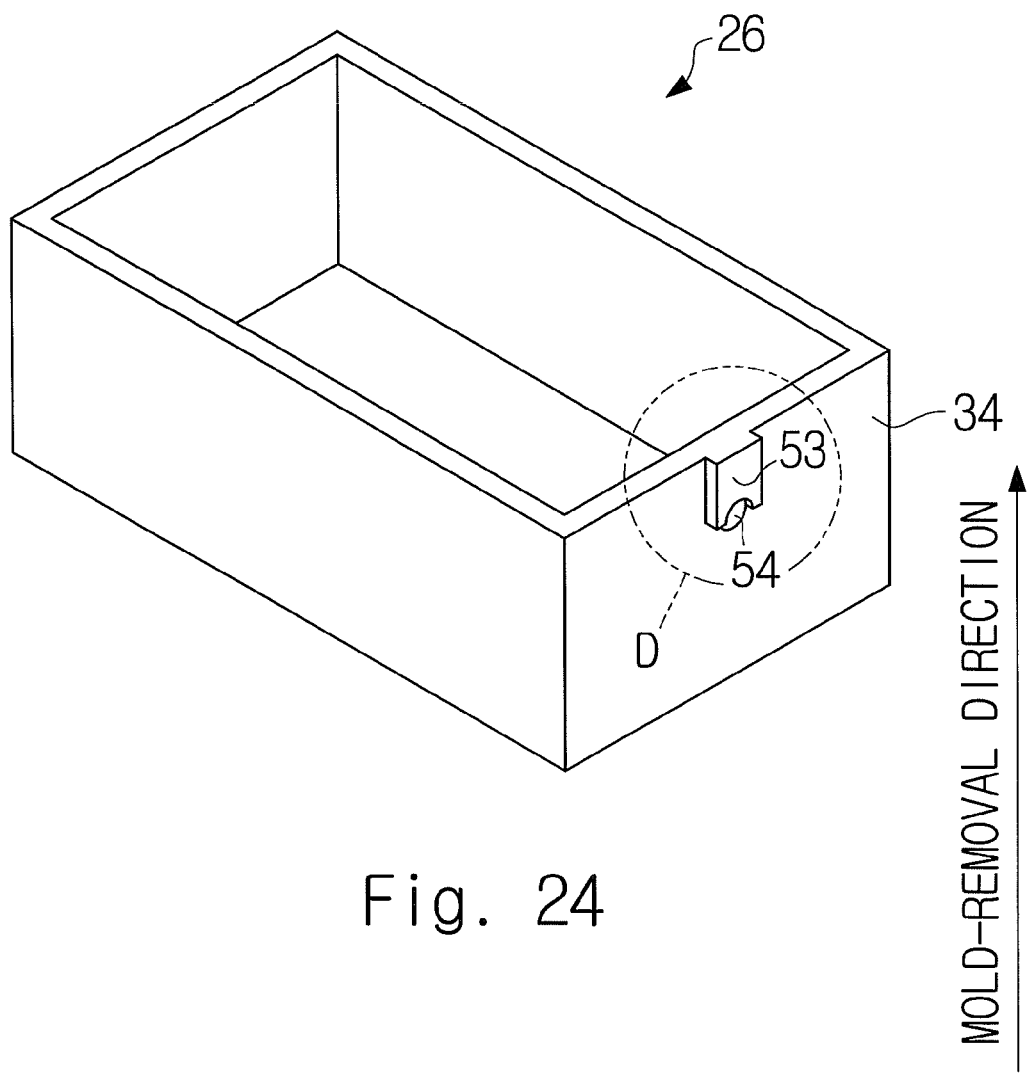
FIG. 24 is a perspective view of an injection-molded article (fourth exemplary embodiment)
Figure 25:
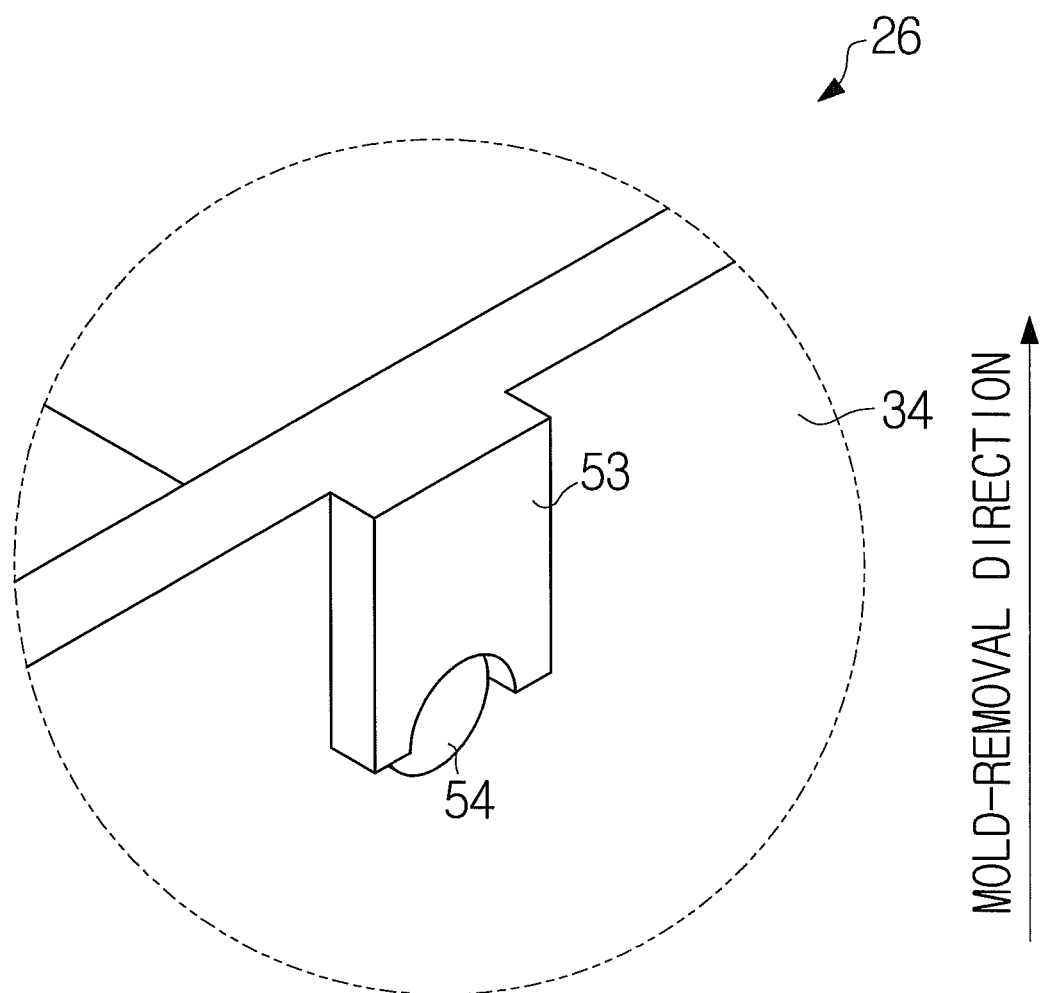
FIG. 25 is an enlarged view of a portion D shown in FIG. 24 (fourth exemplary embodiment)

As shown in FIGS. 20 to 22, on the second side-wall surface 28b, a recessed portion 51 recessed from the second side-wall surface 28b is formed in a surface area 50 located on the mold-removal direction side with respect to the pin mounting hole. 29 The recessed portion 51 has, for example, a rectangular parallelepiped shape with a depth of about 100 micrometers. The end face 52 of the recessed portion 51 in the direction opposite to the mold-removal direction is located at the same height as the central axis 29C of the pin mounting hole 29. That is, the position of the end face 52 of the recessed portion 51 in the mold-removal direction coincides with the position of the central axis 29C of the pin mounting hole 29 in the mold-removal direction. Further, the recessed portion 51 embraces the surface area 50 as the second side-wall surface 28b is viewed from the front as shown in FIG. 22. In particular, the width 51W of the recessed portion 51 that is specified in the direction perpendicular to the mold-removal direction as the second side-wall surface 28b is viewed from the front as shown in FIG. 22 is determined so as to be equal to or greater than the width 30W of the pin member 30 that is specified in the direction perpendicular to the mold-removal direction as the second side-wall surface 28b is viewed from the front as shown in FIG. 22. Therefore, as shown in FIG. 23, even if the end face 31 of the pin member 30 is not flush with the second side-wall surface 28b and the end portion 43 of the pin member 30 is positioned in a place recessed from the second side-wall surface 28b by about 50 micrometers, for example, the so-called "undercut portion" is never formed in the injection-molded article 26 as shown in FIGS. 24 and 25. Note that in the example shown in FIG. 23, the depth "c" of the recessed portion 51 with respect to the second side-wall surface 28b is set to a value greater than the depth "d" of the end portion 43 of the pin member 30 with respect to the second side-wall surface 28b.

As shown in FIGS. 24 and 25, a roughly rectangular parallelepiped protruding portion 53, which had engaged with the recessed portion 51, is formed in the outer wall surface 34 of the injection-molded article 26, which was injection-molded by using the mold for injection molding 5 according to this exemplary embodiment. Further, when the end portion 43 of the pin member 30 is positioned in a place recessed from the second side-wall surface 28b as shown in FIG. 23, a roughly cylindrical protruding portion 54, which had engaged with the pin mounting hole 29, is formed in the outer wall surface 34 of the injection-molded article 26 as shown in FIGS. 24 and 25. In the example shown in FIGS. 24 and 25, the protruding portion 53 and the protruding portion 54 are formed in a continuous fashion. Note that the depth of the recessed portion 51 shown in FIG. 23 is set to a sufficiently large value so that the height of the protruding portion 53, which engages with the recessed portion 51, becomes larger than the height of the protruding portion 54, which engages with the pin mounting hole 29. Note that the "height" is specified by using the second side-wall surface 28b as the reference surface.

To sum up, the fourth exemplary embodiment according to the present invention, which has been explained above, has the following characteristics.

That is, on the second side-wall surface 28b, the recessed portion 51 recessed from the second side-wall surface 28b is formed in the surface area 50 located on the mold-removal direction side with respect to the pin mounting hole 29. With the above-described structure, the injection-molded article 26 can be removed from the mold for injection molding 5 without problems even when the cavity-side end portion 43 of the pin member 30, which is inserted into the pin mounting hole 29, is positioned in a place recessed from the second side-wall surface 28b to some extent.

[Fifth Exemplary Embodiment]

Figure 26:
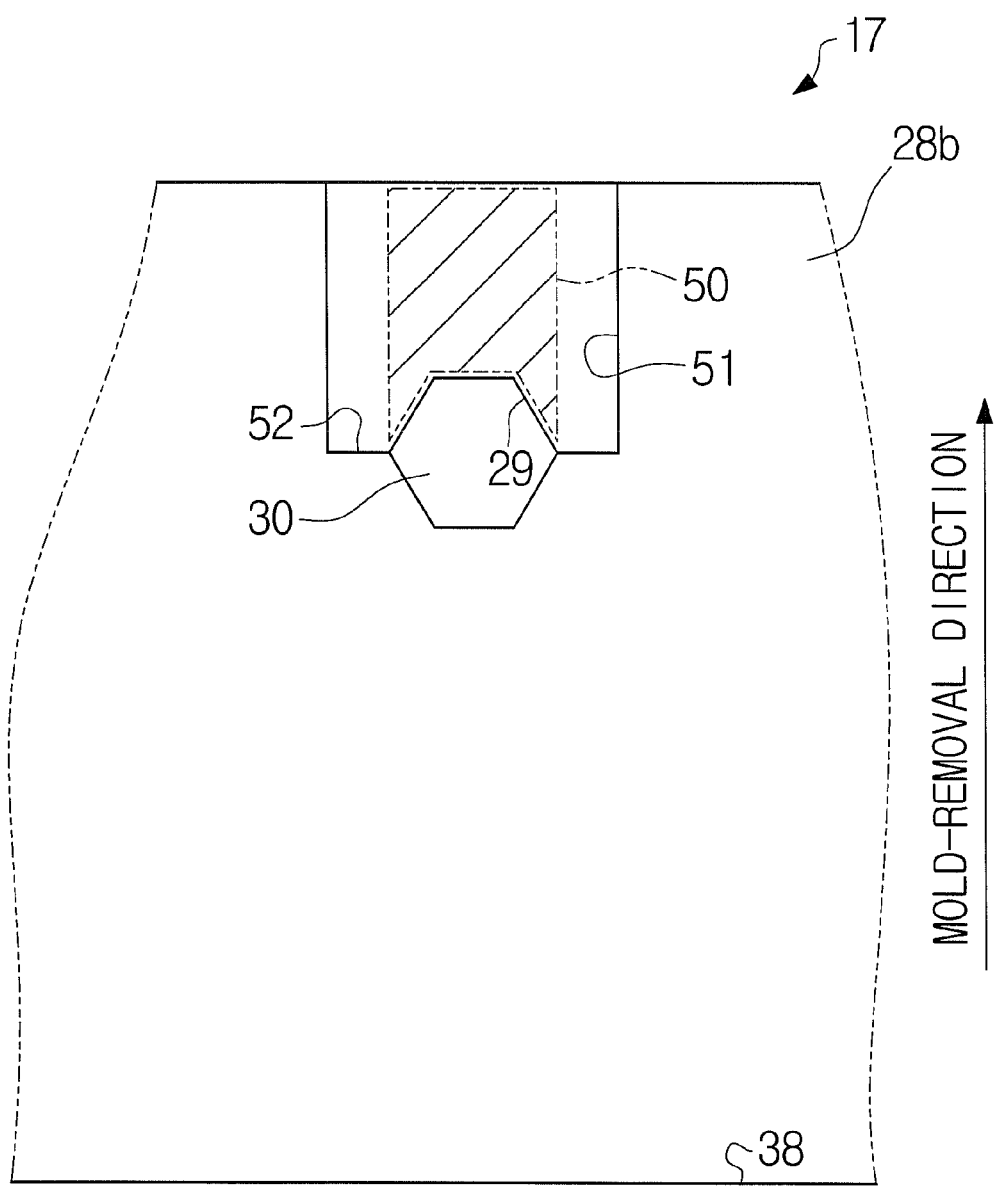
FIG. 26 is an enlarged front view of a recessed portion (fifth exemplary embodiment)

Next, a fifth exemplary embodiment according to the present invention is explained with reference to FIG. 26. The following explanation is made with a particular emphasis on differences of this exemplary embodiment from the above-described fourth exemplary embodiment, and duplicated explanation may be omitted as appropriate. Further, in principle, the same symbols are assigned to components corresponding to the respective components of the above-described fourth exemplary embodiment.

In the above-described fourth exemplary embodiment, the pin member 30 is circular in cross-section. However, the pin member 30 in this exemplary embodiment is polygonal in cross-section, and in particular regular hexagonal in cross-section. In concert with this feature, the pin mounting hole 29 is also polygonal, in particular regular hexagonal in cross-section in this exemplary embodiment.

[Sixth Exemplary Embodiment]

Figure 27:
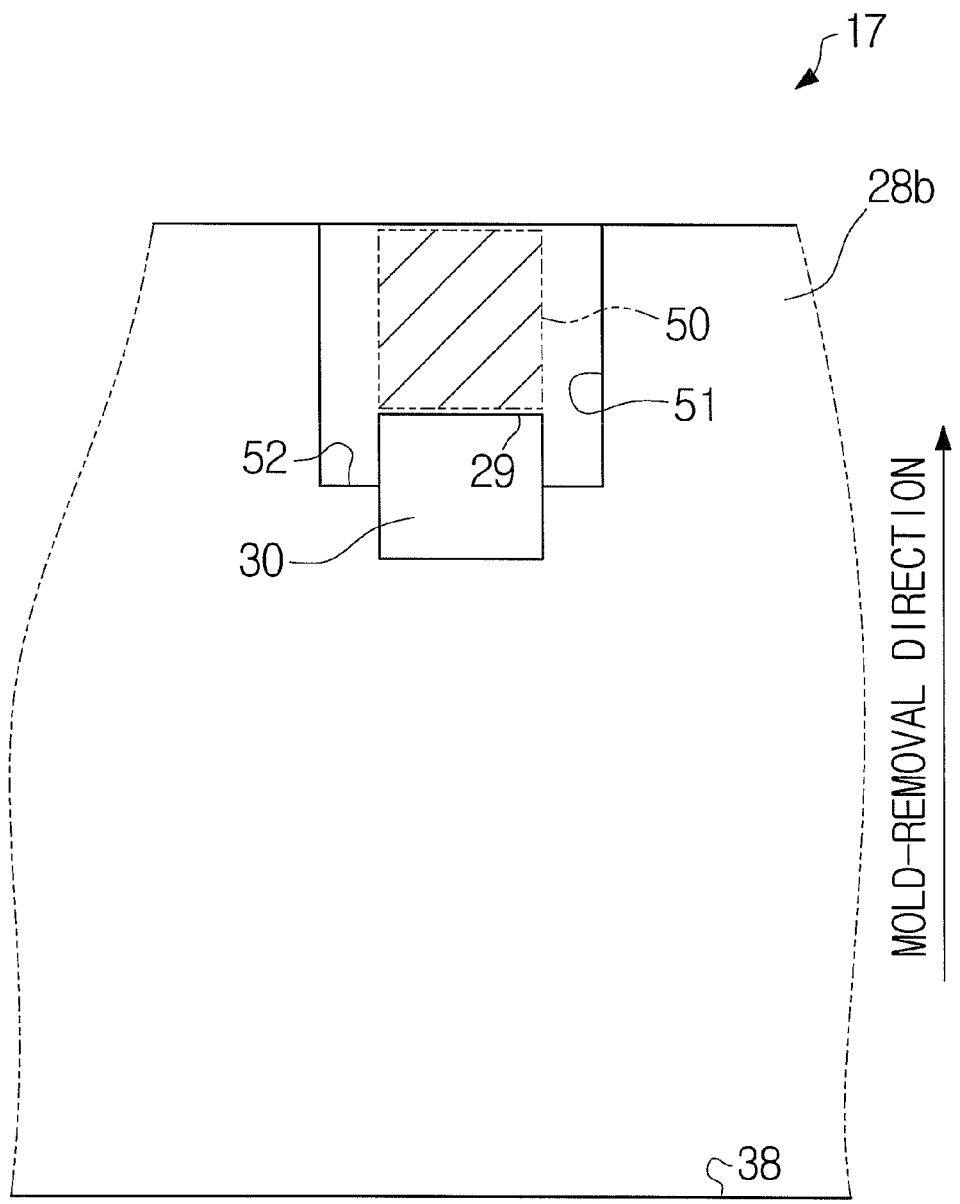
FIG. 27 is an enlarged front view of a recessed portion (sixth exemplary embodiment)
Figure 28:
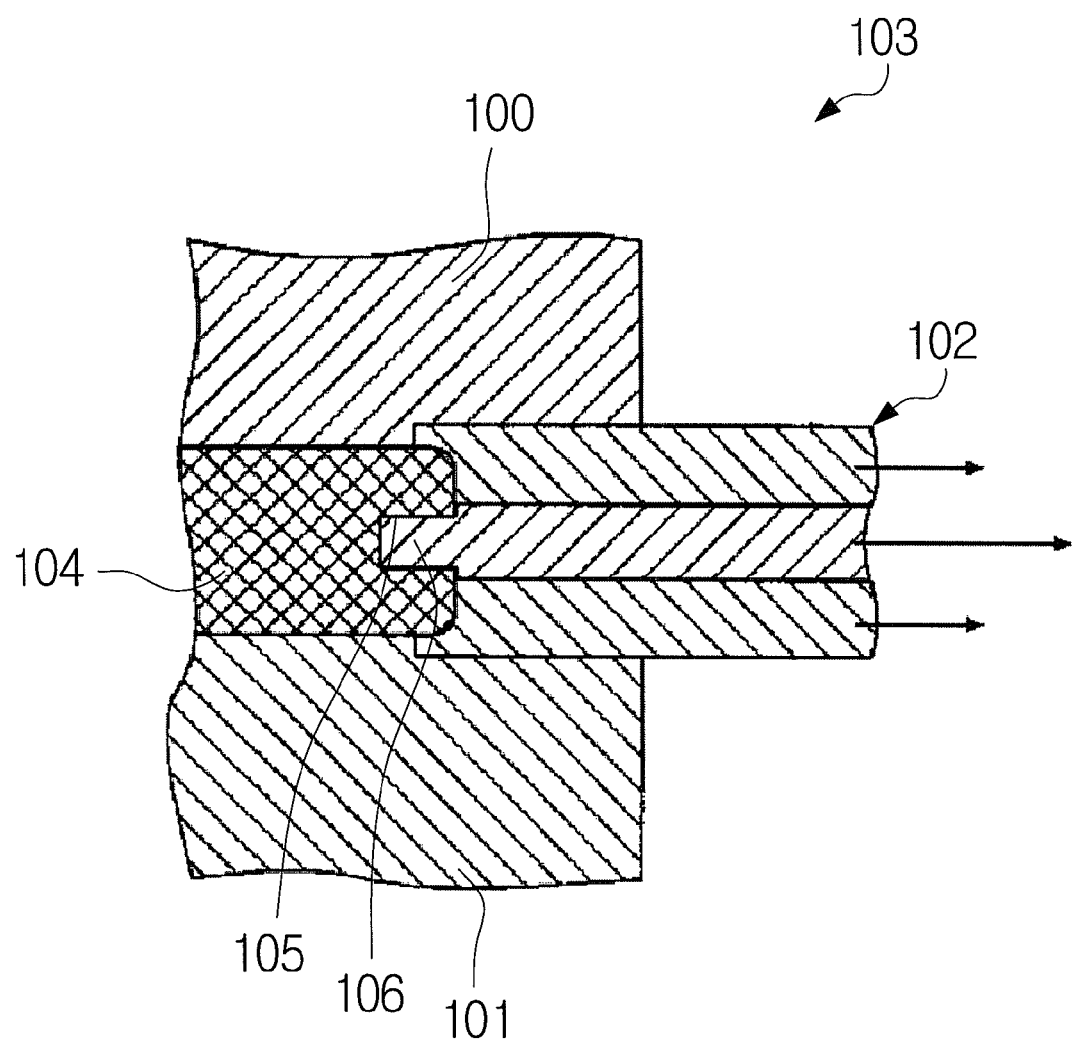
FIG. 28 is a figure corresponding to FIG. 8 of Patent literature 1.

Next, a sixth exemplary embodiment according to the present invention is explained with reference to FIG. 27. The following explanation is made with a particular emphasis on differences of this exemplary embodiment from the above-described fourth exemplary embodiment, and duplicated explanation may be omitted as appropriate. Further, in principle, the same symbols are assigned to components corresponding to the respective components of the above-described fourth exemplary embodiment.

In the above-described fourth exemplary embodiment, the pin member 30 is circular in cross-section. However, the pin member 30 in this exemplary embodiment is polygonal, in particular rectangular in cross-section. In concert with this feature, the pin mounting hole 29 is also polygonal, in particular rectangular in cross-section in this exemplary embodiment.

Several preferred exemplary embodiments according to the present invention have been explained so far, and the following modifications can be also made to each of the above-described exemplary embodiments.

Both of the protruding portion 40 and the recessed portion 51 may be simultaneously provided in the second side-wall surface 28b. In this case, the injection-molded article 26 can be removed from the movable-side mold plate 17 without problems regardless of whether the end portion 43 of the pin member 30 somewhat protrudes from the second side-wall surface 28b to the cavity 8 or the end portion 43 is recessed from the second side-wall surface 28b. Therefore, if it is unknown whether the end portion 43 of the pin member 30 will protrude from the second side-wall surface 28b to the cavity 8 or the end portion 43 will be recessed from the second side-wall surface 28b at the point when the cavity 8 is designed, it is preferable to provide both the protruding portion 40 and the recessed portion 51 at the same time for the time being.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mold for injection molding comprising a stationary-side mold plate and a movable-side mold plate, in which a cavity is formed between the stationary-side mold plate and the movable-side mold plate, and an injection-molded article is injection-molded by charging the cavity with a melted resin, wherein
    a pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity, and
    on the side-wall surface in which the pin mounting hole is formed, a protruding portion protruding from the side-wall surface is formed in a surface area located on an opposite side in the mold-removal direction with respect to the pin mounting hole.

2. The mold for injection molding according to claim 1, wherein the side-wall surface in which the pin mounting hole is formed is roughly parallel to the mold-removal direction.

3. The mold for injection molding according to claim 1, wherein the side-wall surface in which the pin mounting hole is formed is an inner wall surface corresponding to a charging end among the inner wall surfaces of the cavity.

4. The mold for injection molding according to claim 1, wherein a central axis of the pin mounting hole is roughly perpendicular to the side-wall surface in which the pin mounting hole is formed.

5. The mold for injection molding according to claim 1, wherein the pin member is circular or polygonal in cross-section.

6. The mold for injection molding according to claim 1, wherein the pin member is mounted in the pin mounting hole.

7. An injection molding machine comprising:
a mold for injection molding, the mold comprising:
a stationary-side mold plate and a movable-side mold plate, in which a cavity is formed between the stationary-side mold plate and the movable-side mold plate, and an injection-molded article is injection-molded by charging the cavity with a melted resin, wherein
a pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity, and
on the side-wall surface in which the pin mounting hole is formed, a protruding portion protruding from the side-wall surface is formed in a surface area located on an opposite side in the mold-removal direction with respect to the pin mounting hole;
means for clamping and opening the mold for injection molding; and
melted-resin supply means for supplying a melted resin into the mold for injection molding.

8. A mold for injection molding comprising a stationary-side mold plate and a movable-side mold plate, in which a cavity is formed between the stationary-side mold plate and the movable-side mold plate, and an injection-molded article is injection-molded by charging the cavity with a melted resin, wherein
a pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity, and
on the side-wall surface in which the pin mounting hole is formed, a recessed portion recessed from the side-wall surface is formed in a surface area located on a mold-removal direction side with respect to the pin mounting hole.

9. The mold for injection molding according to claim 8, wherein the side-wall surface in which the pin mounting hole is formed is roughly parallel to the mold-removal direction.

10. The mold for injection molding according to claim 8, wherein the side-wall surface in which the pin mounting hole is formed is an inner wall surface corresponding to a charging end among the inner wall surfaces of the cavity.

11. The mold for injection molding according to claim 8, wherein a central axis of the pin mounting hole is roughly perpendicular to the side-wall surface in which the pin mounting hole is formed.

12. The mold for injection molding according to claim 8, wherein the pin member is circular or polygonal in cross-section.

13. The mold for injection molding according to claim 8, wherein the pin member is mounted in the pin mounting hole.

14. An injection molding machine comprising:
a mold for injection molding, the mold comprising:
a stationary-side mold plate and a movable-side mold plate, in which a cavity is formed between the stationary-side mold plate and the movable-side mold plate, and an injection-molded article is injection-molded by charging the cavity with a melted resin, wherein
a pin mounting hole in which a pin-shaped pin member is inserted and mounted is formed in a side-wall surface, the side-wall surface being an inner wall surface other than an inner wall surface perpendicular to a mold-removal direction of the injection-molded article among inner wall surfaces of the cavity, and
on the side-wall surface in which the pin mounting hole is formed, a recessed portion recessed from the side-wall surface is formed in a surface area located on a mold-removal direction side with respect to the pin mounting hole;
means for clamping and opening the mold for injection molding; and
melted-resin supply means for supplying a melted resin into the mold for injection molding.

* * * * *